(12) United States Patent
Kwong et al.

(10) Patent No.: US 12,368,864 B2
(45) Date of Patent: Jul. 22, 2025

(54) FACILITATING ENCODING OF VIDEO DATA USING NEURAL NETWORK

(71) Applicant: City University of Hong Kong, Kowloon (HK)

(72) Inventors: Sam Tak Wu Kwong, Kowloon (HK); Yunhao Mao, Kowloon (HK); Shiqi Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 148 days.

(21) Appl. No.: 18/364,821

(22) Filed: Aug. 3, 2023

(65) Prior Publication Data

US 2025/0047864 A1 Feb. 6, 2025

(51) Int. Cl.
*H04N 19/149* (2014.01)
*H04N 19/159* (2014.01)
*H04N 19/169* (2014.01)

(52) U.S. Cl.
CPC ......... *H04N 19/149* (2014.11); *H04N 19/159* (2014.11); *H04N 19/1883* (2014.11)

(58) Field of Classification Search
CPC ............... H04N 19/149; H04N 19/159; H04N 19/1883; H04N 19/147; H04N 19/176; H04N 19/19; H04N 19/96
USPC .................................................. 375/240.02
See application file for complete search history.

(56) References Cited

U.S. PATENT DOCUMENTS

| | | | |
|---|---|---|---|
| 6,831,947 B2 | 12/2004 | Ribas Corbera | |
| 8,532,169 B2 | 9/2013 | Wang et al. | |
| 8,588,296 B2 | 11/2013 | Yang et al. | |
| 8,897,370 B1 * | 11/2014 | Wang | H04N 19/59 375/240.2 |
| 9,860,543 B2 | 1/2018 | Xu et al. | |
| 10,542,262 B2 | 1/2020 | Gao et al. | |
| 10,560,696 B2 | 2/2020 | Gao et al. | |
| 11,025,914 B1 | 6/2021 | Yuen et al. | |

(Continued)

FOREIGN PATENT DOCUMENTS

| | | |
|---|---|---|
| CN | 106416251 B | 2/2020 |
| CN | 107113432 B | 9/2020 |
| JP | 6019189 B2 | 11/2016 |

OTHER PUBLICATIONS

Z. Liu, Z. Chen, Y. Li, Y. Wu, and S. Liu, "AHG10: Quality dependency factor based rate control for VVC," JVET M0600, Jan. 2019.

(Continued)

*Primary Examiner* — Christopher S Kelley
*Assistant Examiner* — Ana Picon-Feliciano
(74) *Attorney, Agent, or Firm* — Renner, Kenner, Greive, Bobak, Taylor & Weber

(57) ABSTRACT

A computer-implemented method for facilitating encoding of video data. The method includes performing an operation to determine prediction residuals associated with a unit of the video data, and, processing, using a neural network arrangement, the prediction residuals associated with the unit of the video data to determine model parameters associated with a rate-distortion model for the unit of the video data. The model parameters are arranged to facilitate encoding of at least the unit of the video data. The method can be applied to multiple ones of such unit of the video data.

25 Claims, 12 Drawing Sheets

(56) References Cited

U.S. PATENT DOCUMENTS

| | | | | |
|---|---|---|---|---|
| 2011/0310962 | A1* | 12/2011 | Ou | H04N 19/124 375/E7.076 |
| 2022/0256169 | A1* | 8/2022 | Siddaramanna | G06N 3/045 |

OTHER PUBLICATIONS

G. Ren, J. Jia, J. Wang, Z. Chen, and Z. Liu, "AHG10: An improved VVC rate control scheme," JVET Y0105, Jan. 2022.

B. Xu, X. Pan, Y. Zhou, Y. Li, D. Yang, and Z. Chen, "CNN-based rate-distortion modeling for H. 265/HEVC," in 2017 IEEE Visual Communications and Image Processing (VCIP). IEEE, 2017, pp. 1-4.

M. Santamaria, E. Izquierdo, S. Blasi, and M. Mrak, "Estimation of rate control parameters for video coding using CNN," in 2018 IEEE Visual Communications and Image Processing (VCIP). IEEE, 2018, pp. 1-4.

Y. Li, B. Li, D. Liu, and Z. Chen, "A convolutional neural network-based approach to rate control in HEVC intra coding," in 2017 IEEE Visual Communications and Image Processing (VCIP). IEEE, 2017, pp. 1-4.

M. Zhou, X. Wei, S. Kwong, W. Jia, and B. Fang, "Rate control method based on deep reinforcement learning for dynamic video sequences in HEVC," IEEE Transactions on Multimedia, vol. 23, pp. 1106-1121, 2020.

X. Zhao, S.-H. Kim, Y. Zhao, H. E. Egilmez, M. Koo, S. Liu, J. Lainema, and M. Karczewicz, "Transform coding in the VVC standard," IEEE Transactions on Circuits and Systems for Video Technology, vol. 31, No. 10, pp. 3878-3890, 2021.

C.-Y. Tsai, C.-Y. Chen, T. Yamakage, I. S. Chong, Y.-W. Huang,C.-M. Fu, T. Itoh, T. Watanabe, T. Chujoh, M. Karczewicz, and S.-M. Lei, "Adaptive loop filtering for video coding," IEEE Journal of Selected Topics in Signal Processing, vol. 7, No. 6, pp. 934-945, 2013.

K. Andersson, K. Misra, M. Ikeda, D. Rusanovskyy, and S. Iwamura, "Deblocking filtering in VVC," in 2021 Picture Coding Symposium (PCS), 2021, pp. 1-5.

Z. Ni, W. Yang, S. Wang, L. Ma, and S. Kwong, "Towards unsupervised deep image enhancement with generative adversarial network," IEEE Transactions on Image Processing, vol. 29, pp. 9140-9151, 2020.

S. Ioffe and C. Szegedy, "Batch normalization: Accelerating deep network training by reducing internal covariate shift," in International conference on machine learning. PMLR, 2015,pp. 448-456.

A. L. Maas, A. Y. Hannun, A. Y. Ng, "Rectifier nonlinearities improve neural network acoustic models," in Proc. icml, vol. 30, No. 1. Citeseer, 2013, p. 3.

Y. LeCun, L. Bottou, Y. Bengio, and P. Haffner, "Gradient-based learning applied to document recognition," Proceedings of the IEEE, vol. 86, No. 11, pp. 2278-2324, 1998.

X. Glorot, A. Bordes, and Y. Bengio, "Deep sparse rectifier neural networks," in Proceedings of the fourteenth international conference on artificial intelligence and statistics. JMLR Workshop and Conference Proceedings, 2011, pp. 315-323.

D. Ma, F. Zhang, and D. R. Bull, "BVI-DVC: a training database for deep video compression," arXiv preprint arXiv:2003.13552, 2020.

F. Bossen, J. Boyce, K. Suehring, X. Li, and V. Seregin, "VTM common test conditions and software reference configurations for SDR video," JVET T2010, Oct. 2020.

A. Paszke, S. Gross, F. Massa, A. Lerer, J. Bradbury, G. Chanan, T. Killeen, Z. Lin, N. Gimelshein, L. Antiga et al., "Pytorch: An imperative style, high-performance deep learning library," Advances in neural information processing systems, vol. 32, 2019.

K. He, X. Zhang, S. Ren, and J. Sun, "Delving deep into rectifiers: Surpassing human-level performance on imagenet classification," in Proceedings of the IEEE international con-ference on computer vision, 2015, pp. 1026-1034.

D. P. Kingma and J. L. Ba, "Adam: A method for stochastic optimization," arXiv preprint arXiv:1412.6980, 2014.

J. Garrett-Glaser, "A novel macroblock-tree algorithm for high-performance optimization of dependent video coding in H. 264/AVC," Tech. Rep., 2009.

J. Han, P. Wilkins, Y. Xu, and J. Bankoski, "A temporal dependency model for rate-distortion optimization in video coding," in 2019 27th European Signal Processing Conference (EUSIPCO). IEEE, 2019, pp. 1-4.

Y. Mao, M. Wang, Z. Ni, S. Wang and S. Kwong, "Neural Network Based Rate Control for Versatile Video Coding," in IEEE Transactions on Circuits and Systems for Video Technology, doi: 10.1109/TCSVT.2023.3262303.

T. Sikora, "The MPEG-4 video standard verification model," IEEE Transactions on circuits and systems for video technology, vol. 7, No. 1, pp. 19-31, 1997.

T. Wiegand, G. J. Sullivan, G. Bjontegaard, and A. Luthra, "Overview of the H.264/AVC video coding standard," IEEE Transactions on Circuits and Systems for Video Technology, vol. 13, No. 7, pp. 560-576, 2003.

G. J. Sullivan, J. Ohm, W. Han, and T. Wiegand, "Overview of the high efficiency video coding (HEVC) standard," IEEE Transactions on Circuits and Systems for Video Technology, vol. 22, No. 12, pp. 1649-1668, 2012.

B. Bross, Y.-K. Wang, Y. Ye, S. Liu, J. Chen, G. J. Sullivan, and J.-R. Ohm, "Overview of the versatile video coding (VVC) standard and its applications," IEEE Transactions on Circuits and Systems for Video Technology, vol. 31, No. 10, pp. 3736-3764, 2021.

Y.-W. Huang, J. An, H. Huang, X. Li, S.-T. Hsiang, K. Zhang, H. Gao, J. Ma, and O. Chubach, "Block partitioning structure in the VVC standard," IEEE Transactions on Circuits and Systems for Video Technology, vol. 31, No. 10, pp. 3818-3833, 2021.

L. Zhang, K. Zhang, H. Liu, H. C. Chuang, Y. Wang, J. Xu, P. Zhao, and D. Hong, "History-based motion vector prediction in versatile video coding," in 2019 Data Compression Confer-ence (DCC), 2019, pp. 43-52.

S. De-Luxán-Hernández, V. George, J. Ma, T. Nguyen, H. Schwarz, D. Marpe, and T. Wiegand, "An intra subpartition coding modefor VVC," in 2019 IEEE International Conference on Image Processing (ICIP), 2019, pp. 1203-1207.

K. Zhang, Y.-W. Chen, L. Zhang, W.-J. Chien, and M. Karczewicz, "An improved framework of affine motion compensation in video coding," IEEE Transactions on Image Processing, vol. 28, No. 3, pp. 1456-1469, 2019.

H. Liu, L. Zhang, K. Zhang, J. Xu, Y. Wang, J. Luo, and Y. He, "Adaptive motion vector resolution for affine-inter mode coding," in 2019 Picture Coding Symposium (PCS), 2019, pp. 1-4.

L. Zhao, X. Zhao, S. Liu, X. Li, J. Lainema, G. Rath, F. Urban, and F. Racapé, "Wide angular intra prediction for versatile video coding," in 2019 Data Compression Conference (DCC), 2019, pp. 53-62.

X. Zhao, J. Chen, M. Karczewicz, A. Said, and V. Seregin, "Joint separable and non-separable transforms for next-generation video coding," IEEE Transactions on Image Pro-cessing, vol. 27, No. 5, pp. 2514-2525, 2018.

H. Schwarz, T. Nguyen, D. Marpe, and T. Wiegand, "Hybrid video coding with trellis-coded quantization," in 2019 Data Compression Conference (DCC), Mar. 2019, pp. 182-191.

A. J. Viterbi, "Error bounds for convolutional codes and an asymptotically optimum decoding algorithm," IEEE transactions on Information Theory, vol. 13, No. 2, pp. 260-269, 1967.

K. Andersson, J. Enhorn, R. Sjöberg, J. Ström, and L. Litwic, "Addition of a GOP hierarchy of 32 for random access configuration for VTM," JVET-S0180, Jun. 2020.

H. Yang, L. Shen, X. Dong, Q. Ding, P. An, and G. Jiang, "Low-complexity ctu partition structure decision and fast intra mode decision for versatile video coding," IEEE Transactions on Circuits and Systems for Video Technology, vol. 30, No. 6, pp. 1668-1682, 2020.

X. Dong, L. Shen, M. Yu, and H. Yang, "Fast intra mode decision algorithm for versatile video coding," IEEE Transactions on Multimedia, vol. 24, pp. 400-414, 2022.

(56) References Cited

OTHER PUBLICATIONS

Z. Pan, S. Kwong, M.-T. Sun, and J. Lei, "Early MERGE mode decision based on motion estimation and hierarchical depth correlation for hevc," IEEE Transactions on Broadcasting, vol. 60, No. 2, pp. 405-412, 2014.
S. Ma, X. Zhang, C. Jia, Z. Zhao, S. Wang, and S. Wang, "Image and video compression with neural networks: A review," IEEE Transactions on Circuits and Systems for Video Technology, vol. 30, No. 6, pp. 1683-1698, 2019.
X. He, Q. Hu, X. Han, X. Zhang, C. Zhang, and W. Lin, "Enhancing HEVC compressed videos with a partition-masked convolutional neural network," in 2018 25th IEEE International Conference on Image Processing (ICIP). IEEE, 2018, pp. 216-220.
Z. Pan, X. Yi, Y. Zhang, B. Jeon, and S. Kwong, "Efficient in-loop filtering based on enhanced deep convolutional neural networks for HEVC," IEEE Transactions on Image Processing, vol. 29, pp. 5352-5366, 2020.
Y. Wang, H. Zhu, Y. Li, Z. Chen, and S. Liu, "Dense residual convolutional neural network based in-loop filter for HEVC," in 2018 IEEE Visual Communications and Image Processing (VCIP). IEEE, 2018, pp. 1-4.
N. Yan, D. Liu, H. Li, B. Li, L. Li, and F. Wu, "Convolutional neural network-based fractional-pixel motion compensation," IEEE Transactions on Circuits and Systems for Video Technol-ogy, vol. 29, No. 3, pp. 840-853, 2018.
J. Mao and L. Yu, "Convolutional neural network based bi-prediction utilizing spatial and temporal information in video coding," IEEE Transactions on Circuits and Systems for Video Technology, vol. 30, No. 7, pp. 1856-1870, 2019.
Y. Wang, X. Fan, S. Liu, D. Zhao, and W. Gao, "Multi-scale convolutional neural network-based intra prediction for video coding," IEEE Transactions on Circuits and Systems for Video Technology, vol. 30, No. 7, pp. 1803-1815, 2019.
H. Sun, Z. Cheng, M. Takeuchi, and J. Katto, "Enhanced intra prediction for video coding by using multiple neural networks," IEEE Transactions on Multimedia, vol. 22, No. 11, pp. 2764-2779, 2020.
L. Zhu, Y. Zhang, S. Wang, S. Kwong, X. Jin, and Y. Qiao, "Deep learning-based chroma prediction for intra versatile video coding," IEEE Transactions on Circuits and Systems for Video Technology, vol. 31, No. 8, pp. 3168-3181, 2020.
L. Zhu, S. Kwong, Y. Zhang, S. Wang, and X. Wang, "Generative adversarial network-based intra prediction for video coding," IEEE transactions on multimedia, vol. 22, No. 1, pp. 45-58, 2019.
L. Zhao, S. Wang, X. Zhang, S. Wang, S. Ma, and W. Gao, "Enhanced motion-compensated video coding with deep virtual reference frame generation," IEEE Transactions on Image Processing, vol. 28, No. 10, pp. 4832-4844, 2019.
Z. Zhao, S. Wang, S. Wang, X. Zhang, S. Ma, and J. Yang, "Enhanced bi-prediction with convolutional neural network for high-efficiency video coding," IEEE Transactions on Circuits and Systems for Video Technology, vol. 29, No. 11, pp. 3291-3301, 2018.
C. Ma, D. Liu, X. Peng, L. Li, and F. Wu, "Convolutional neural network-based arithmetic coding for HEVC intra-predicted residues," IEEE Transactions on Circuits and Systems for Video Technology, vol. 30, No. 7, pp. 1901-1916, 2019.
R. Song, D. Liu, H. Li, and F. Wu, "Neural network-based arithmetic coding of intra prediction modes in HEVC," in 2017 IEEE Visual Communications and Image Processing (VCIP). IEEE, 2017, pp. 1-4.
H. Gish and J. N. Pierce, "Asymptotically efficient quantizing," IEEE Transactions on Information Theory, vol. 14, No. 5, pp. 676-683, 1968.
T. Eude, R. Grisel, H. Cherifi, and R. Debrie, "On the distribution of the DCT coefficients," in Proceedings of ICASSP '94. IEEE International Conference on Acoustics, Speech and Signal Processing, vol. v, 1994, pp. V/365-V/368 vol. 5.
E. Y. Lam and J. W. Goodman, "A mathematical analysis of the DCT coefficient distributions for images," IEEE Transactions on Image Processing, vol. 9, No. 10, pp. 1661-1666, 2000.
E. Yang, X. Yu, J. Meng, and C. Sun, "Transparent composite model for DCT Coefficients: Design and Analysis," IEEE Transactions on Image Processing, vol. 23, No. 3, pp. 1303-1316, 2014.
Y. Mao, M. Wang, S. Wang, and S. Kwong, "High efficiency rate control for versatile video coding based on composite cauchy distribution," IEEE Transactions on Circuits and Sys-tems for Video Technology, 2021.
X. Li, N. Oertel, A. Hutter, and A. Kaup, "Laplace distribution based lagrangian rate distortion optimization for hybrid video coding," IEEE Transactions on Circuits and Systems for Video Technology, vol. 19, No. 2, pp. 193-205, 2009.
S. Ma, W. Gao, and Y. Lu, "Rate-distortion analysis for H.264/AVC video coding and its application to rate control," IEEE Transactions on Circuits and Systems for Video Technol-ogy, vol. 15, No. 12, pp. 1533-1544, 2005.
B. Li, H. Li, L. Li, and J. Zhang, "$\lambda$-domain rate control algorithm for high efficiency video coding," IEEE Transactions on Image Processing, vol. 23, No. 9, pp. 3841-3854, 2014.
L. Li, B. Li, H. Li, and C. W. Chen, "$\lambda$-domain optimal bit allocation algorithm for high efficiency video coding," IEEE Transactions on Circuits and Systems for Video Technology, vol. 28, No. 1, pp. 130-142, 2018.
G. J. Sullivan and T. Wiegand, "Rate-distortion optimization for video compression," IEEE Signal Processing Magazine, vol. 15, No. 6, pp. 74-90, 1998.
W. Gao, Q. Jiang, R. Wang, S. Ma, G. Li, and S. Kwong, "Consistent quality oriented rate control in HEVC via balancing intra and inter frame coding," IEEE Transactions on Industrial Informatics, vol. 18, No. 3, pp. 1594-1604, 2022.
M. Zhou, X. Wei, S. Kwong, W. Jia, and B. Fang, "Just noticeable distortion-based perceptual rate control in HEVC," IEEE Transactions on Image Processing, vol. 29, pp. 7603-7614, 2020.
M. Zhou, X. Wei, S. Wang, S. Kwong, C.-K. Fong, P. H. Wong, and W. Y. Yuen, "Global rate-distortion optimization-based rate control for HEVC HDR coding," IEEE Transactions on Circuits and Systems for Video Technology, vol. 30, No. 12, pp. 4648-4662, 2019.
H. Guo, C. Zhu, M. Xu, and S. Li, "Inter-block dependency-based CTU level rate control for HEVC," IEEE Transactions on Broadcasting, vol. 66, No. 1, pp. 113-126, 2019.
F. Liu and Z. Chen, "Multi-objective optimization of quality in VVC rate control for low-delay video coding," IEEE Transactions on Image Processing, vol. 30, pp. 4706-4718, 2021.
H. Choi, J. Yoo, J. Nam, D. Sim, and I. V. Baji , "Pixel-wise unified rate-quantization model for multi-level rate control," IEEE Journal of Selected Topics in Signal Processing, vol. 7, No. 6, pp. 1112-1123, 2013.
H.-J. Lee, T. Chiang, and Y.-Q. Zhang, "Scalable rate control for MPEG-4 video," IEEE Transactions on Circuits and Systems for Video Technology, vol. 10, No. 6, pp. 878-894, 2000.
Z. He, Y. K. Kim, and S. K. Mitra, "Low-delay rate control for DCT video coding via $\rho$-domain source modeling," IEEE Transactions on Circuits and Systems for Video Technology, vol. 11, No. 8, pp. 928-940, 2001.
Y. Li and Z. Chen, "Rate control for VVC," JVET K0390, Jul. 2018.

\* cited by examiner

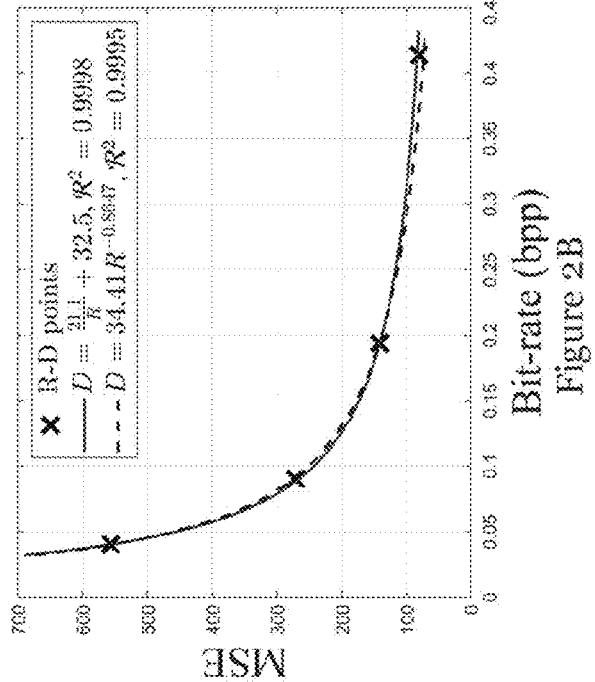
Figure 2A
Figure 2B
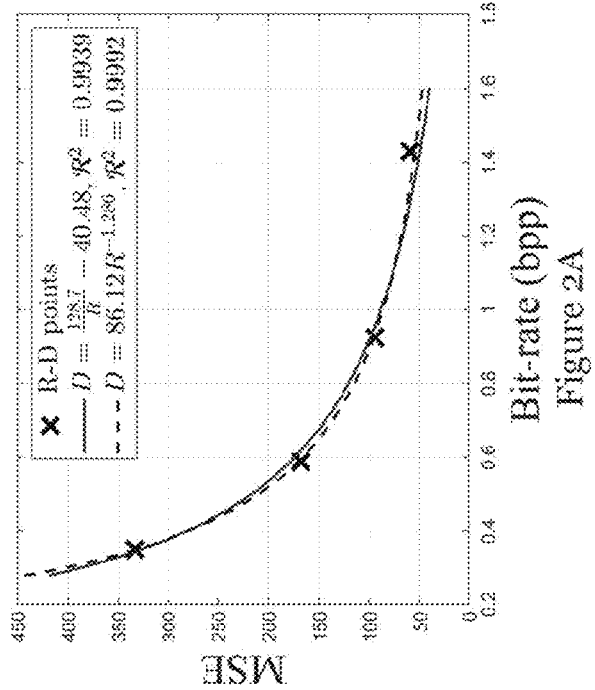
Figure 2C
Figure 2D

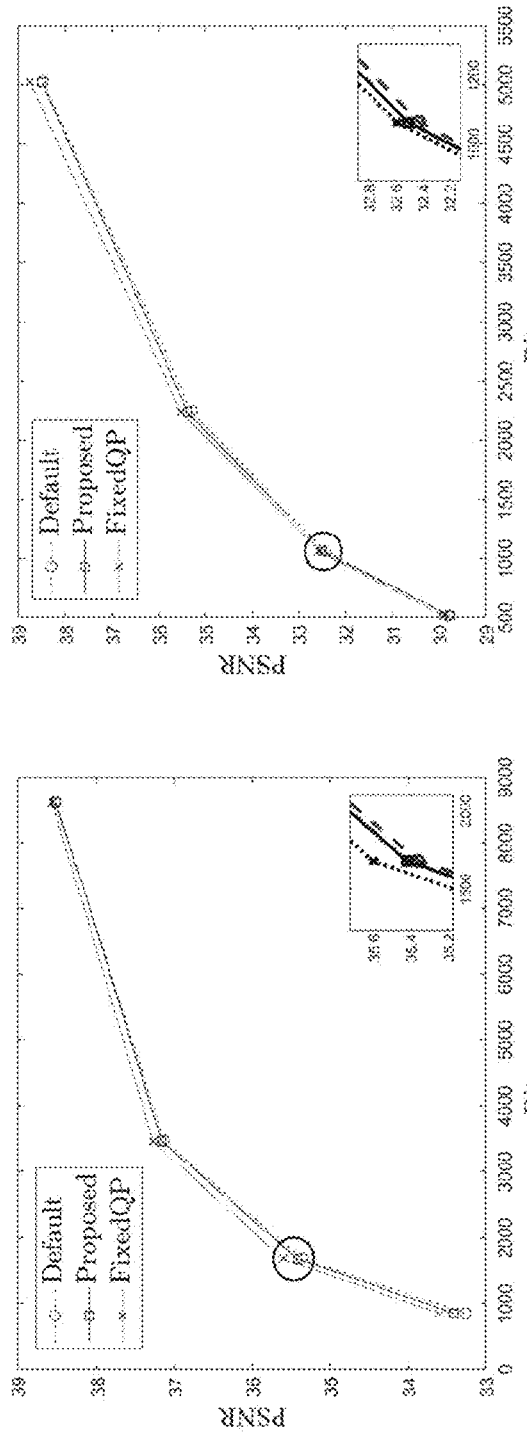
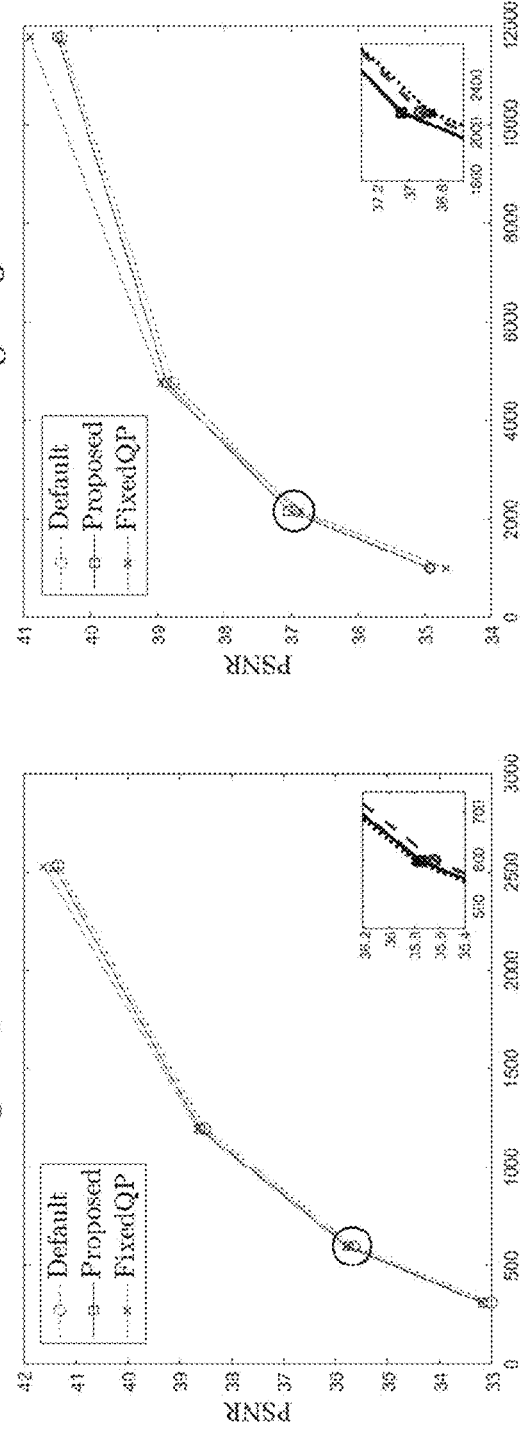
Figure 5A
Figure 5B
Figure 5C
Figure 5D

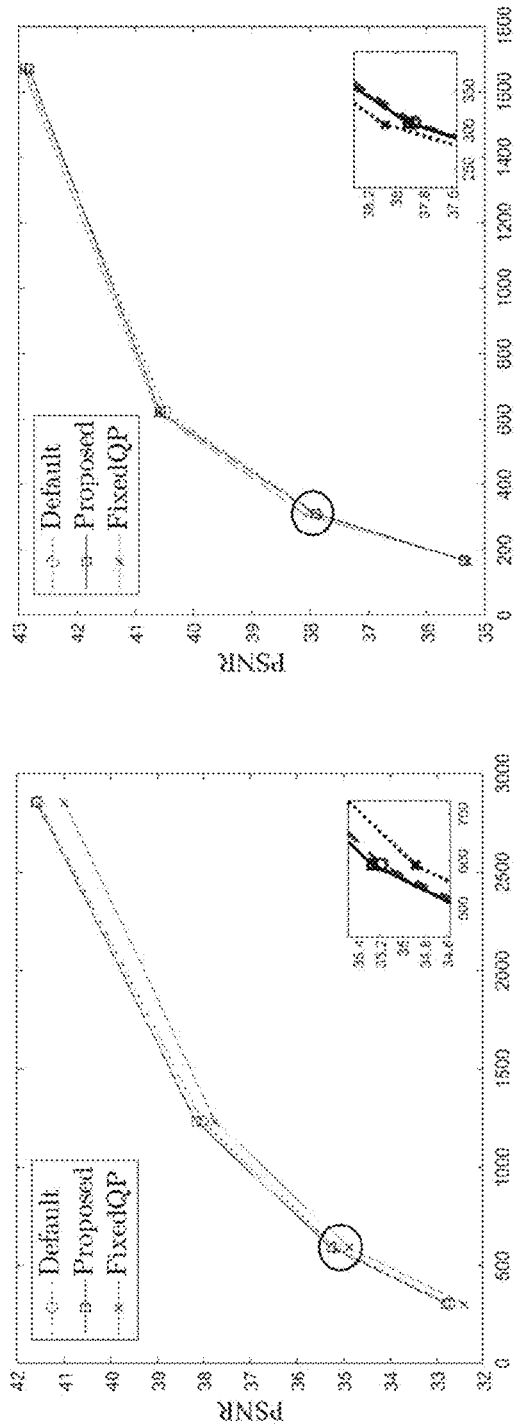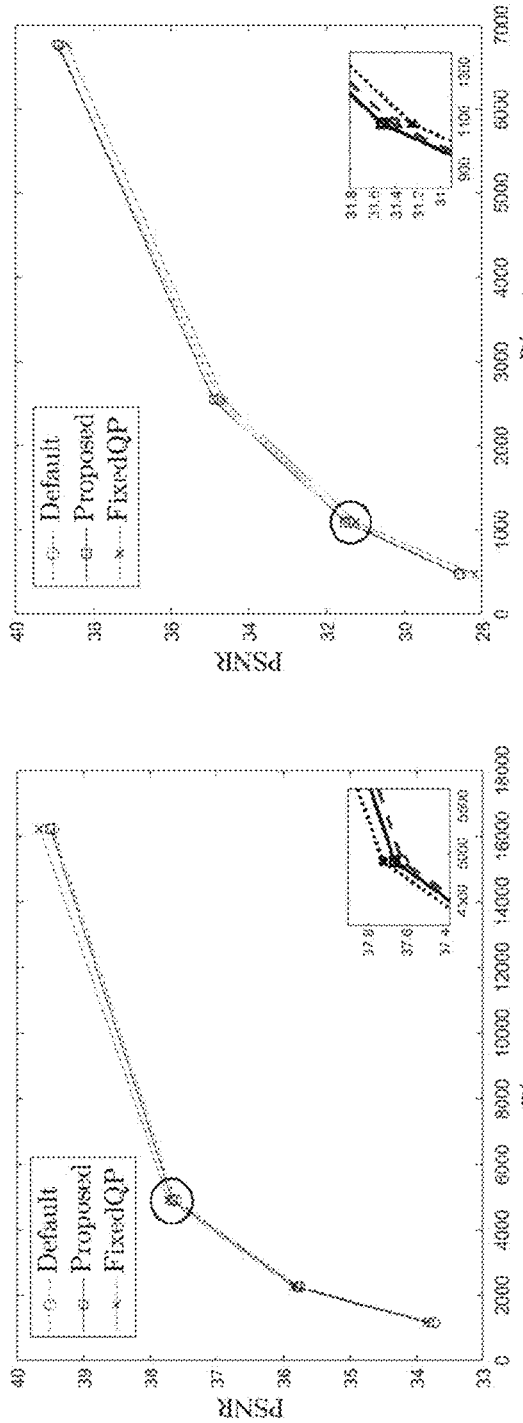

FACILITATING ENCODING OF VIDEO DATA USING NEURAL NETWORK

TECHNICAL FIELD

The invention generally relates to facilitating encoding of video data using neural network based techniques.

BACKGROUND

Video compression (video encoding) is an important video processing technique. To date, various video coding standards have been developed. These standards include, e.g., MPEG-1, MPEG-4, H.264/AVC, and H.265/HEVC. A more recent video coding standard is Versatile Video Coding (VVC), which, compared to High Efficiency Video Coding (HEVC), could achieve significant bit-rate savings under similar perceptual quality.

SUMMARY

In a first aspect, there is provided a computer-implemented method for facilitating encoding of video data. The computer-implemented method comprises: performing an operation to determine prediction residuals associated with a unit of the video data, and processing, using a neural network arrangement, the prediction residuals associated with the unit of the video data to determine model parameters associated with a rate-distortion model for the unit of the video data. The model parameters are arranged to facilitate encoding of at least the unit of the video data. The video data includes data of a video with multiple frames. The computer-implemented method can be performed for one or more of the units of the video data.

The unit of the video data is a processing unit (e.g., basic processing unit) of the video data. In some embodiments, the unit of the video data corresponds to a coding tree unit of the video data, which is the basic processing unit of, e.g., the High Efficiency Video Coding (HEVC) standard and the Versatile Video Coding (VVC) standard. Other coding standards or coding schemes may have other basic processing units.

In some embodiments, the operation comprises partitioning the unit of the video data using at least one of the following partition schemes: quad-tree (QT), binary-tree (BT), or ternary-tree (TT).

In some embodiments, the operation comprises partitioning the unit of the video data using a quad-tree (QT) partition scheme.

In some embodiments, the operation comprises processing, using an encoder, part of the video data containing the unit of the video data, to determine prediction residuals associated with the unit of the video data. The part of the video data may correspond to video data of a frame of the video. In some embodiments, the processing of the part of the video data containing the unit of the video data determines prediction residuals associated with multiple units of the video data (one of which is the unit of the video data). In some embodiments, the encoder is a Versatile Video Coding (VVC) based encoder, e.g., a VTM-13.0 encoder.

In some embodiments, the model parameters comprises a bit-rate (or rate) related model parameter $\alpha$ and a distortion related model parameter $\beta$.

In some embodiments, the neural network arrangement comprises: (i) a first neural network arrangement arranged to process the prediction residuals associated with the unit of the video data to determine the model parameters for intra-frame coding, and/or (ii) a second neural network arrangement arranged to process the prediction residuals associated with the unit of the video data to determine the model parameters for inter-frame coding. Depending on embodiments, the neural network arrangement may only include the first neural network arrangement, only include the second neural network arrangement, or includes both the first and second neural network arrangements. In embodiments in which the neural network arrangement includes both the first and second neural network arrangements, the first and second neural network arrangements may be selectively used.

In some embodiments, the first neural network arrangement comprises: a first neural network arranged to process the prediction residuals associated with the unit of the video data to determine the bit-rate related model parameter $\alpha$ for intra-frame coding, and a second neural network arranged to process the prediction residuals associated with the unit of the video data to determine the distortion related model parameter $\beta$ for intra-frame coding. In some examples, the first neural network of the first neural network arrangement comprises a feature extractor and a regressor. In some examples, the second neural network of the first neural network arrangement comprises a feature extractor and a regressor. In some examples, the first neural network and the second neural network of the first neural network arrangement have substantially the same neural network structure (but may have different parameters, hyperparameters, etc.).

In some embodiments, the second neural network arrangement comprises: a first neural network arranged to process the prediction residuals associated with the unit of the video data to determine the bit-rate related model parameter $\alpha$ for inter-frame coding, and a second neural network arranged to process the prediction residuals associated with the unit of the video data to determine the distortion related model parameter $\beta$ for inter-frame coding. In some examples, the first neural network of the second neural network arrangement comprises a feature extractor and a regressor. In some examples, the second neural network of the second neural network arrangement comprises a feature extractor and a regressor. In some examples, the first neural network and the second neural network of the second neural network arrangement have substantially the same neural network structure.

In some embodiments, the rate-distortion (R-D) model is representable as:

$$D = \frac{\alpha\beta}{R} + C_{DQ}$$

where R denotes bit-rate (or rate), D denotes distortion, and $C_{DQ}$ is a constant.

In some embodiments, the rate-distortion model is formed based on a rate-quantization (R-Q) model and a distortion-quantization (D-Q) model. In some examples, the rate-quantization (R-Q) model is representable as:

$$R = \frac{\alpha}{Q},$$

where R denotes the bit-rate (or rate), $\alpha$ is a model parameter, and Q denotes the quantization step size. In some examples, the distortion-quantization (D-Q) model is representable as: $D=\beta Q+C_{DQ}$, where D denotes distortion, $\beta$ is a model parameter, and $C_{DQ}$ is a constant.

In some embodiments, the computer-implemented method further comprises: adjusting the determined model parameters using one or more adjustment factors to obtain adjusted model parameters to facilitate encoding of at least the unit of the video data. The value(s) of the one or more adjustment factors may be dependent on the encoding of a previous unit of the video data (e.g., the unit right before the unit of the video data to be encoded).

In some embodiments, the adjusting of the determined model parameters comprises: adjusting the bit-rate related model parameter $\alpha$ using a first adjustment factor to obtain an adjusted bit-rate related model parameter $\alpha_i$, and/or adjusting the distortion related model parameter $\beta$ using a second adjustment factor to obtain an adjusted distortion related model parameter $\beta_i$.

In some embodiments, the adjusting of the bit-rate related model parameter $\alpha$ comprises: adjusting the bit-rate related model parameter $\alpha$ for inter-frame coding using the first adjustment factor to obtain an adjusted bit-rate related model parameter $\alpha_i$ for inter-frame coding, or adjusting the bit-rate related model parameter $\alpha$ for intra-frame coding using the first adjustment factor to obtain an adjusted bit-rate related model parameter $\alpha_i$ for intra-frame coding.

In some embodiments, the adjusting of the distortion related model parameter #comprises: adjusting the distortion related model parameter $\beta$ for inter-frame coding using the second adjustment factor to obtain an adjusted distortion related model parameter $\beta_i$ for inter-frame coding, or adjusting the distortion related model parameter $\beta$ for intra-frame coding using the second adjustment factor to obtain an adjusted distortion related model parameter $\beta_i$ for intra-frame coding.

In some embodiments, the computer-implemented method further comprises: determining a target bit-rate for the unit of the video data based on the determined model parameters, determining a quantization step size for the unit of the video data based on the target bit-rate, determining coding parameters for encoding the unit of the video data based on the quantization step size, and encoding the unit of the video data based on the coding parameters.

In some embodiments, the computer-implemented method further comprises: determining a target bit-rate for the unit of the video data based on the adjusted model parameters, determining a quantization step size for the unit of the video data based on the target bit-rate, determining coding parameters for encoding the unit of the video data based on the quantization step size, and encoding the unit of the video data based on the coding parameters.

In some embodiments, the determining of the quantization step size for the unit of the video data is based on:

$$Q_i = \frac{\alpha_i}{R_i}$$

where $Q_i$ is the quantization step size for the unit of the video data and $R_i$ is the target bit-rate for the unit of the video data.

In some embodiments, the coding parameters for encoding the unit of the video data comprises a quantization parameter $QP_i$ and a Lagrangian parameter $\lambda_i$.

In some embodiments, the determining of the coding parameters for encoding the unit of the video data is based on:

$$QP_i = (\log_{X_1} Q_i) \times X_2 + X_3 \text{ and } \lambda_i = Y_1 \times Y_2^{\frac{QP_i}{Y_3}}$$

where $X_1$, $X_2$, $X_3$, $Y_1$, $Y_2$, $Y_3$ are all real numbers.

In some embodiments, the encoding of the unit of the video data is performed using Versatile Video Coding (VVC) based encoding technique.

In some embodiments, the computer-implemented method further comprises, after encoding of the unit of the video data: updating the first adjustment factor to obtain an updated first adjustment factor for use in subsequent bit-rate related model parameter adjustment, and/or updating the second adjustment factor to obtain an updated second adjustment factor for use in subsequent distortion related model parameter adjustment.

In some embodiments, the updating of the first adjustment factor is based on: an actual output bit-rate and an actual quantization step size associated with the encoding of the unit of the video data, and the bit-rate related model parameter $\alpha$ for the unit of the video data. For example, the updating of the first adjustment factor may be affected by a value $\mu^*$ determined based on the actual output bit-rate and the actual quantization step size associated with the encoding of the unit of the video data, and the bit-rate related model parameter $\alpha$ for the unit of the video data. The value $\mu^*$ may affect how much the first adjustment factor should be adjusted in the updating. In some embodiments, the value $\mu^*$ may be compared with one or more predetermined values, to determine how much the first adjustment factor should be adjusted in the updating. In some examples, if the value $\mu^*$ is below a first predetermined value, then the first predetermined value is used to update the first adjustment factor; if the value $\mu^*$ is above a second predetermined value larger than the first predetermined value, then the second predetermined value is used to update the first adjustment factor; if the value $\mu^*$ is between the first predetermined value and the second predetermined value; then the value $\mu^*$ itself is used to update the first adjustment factor.

In some embodiments, the updating of the second adjustment factor is based on: an actual output bit-rate and a Lagrangian parameter associated with the encoding of the unit of the video data, the updated first adjustment factor, and the bit-rate related model parameter $\alpha$ and the distortion related model parameter/for the unit of the video data. For example, the updating of the second adjustment factor may be affected by a value $\nu^*$ determined based on the actual output bit-rate and the Lagrangian parameter associated with the encoding of the unit of the video data, the updated first adjustment factor, and the bit-rate related model parameter $\alpha$ and the distortion related model parameter $\beta$ for the unit of the video data. The value $\nu^*$ may affect how much the second adjustment factor should be adjusted in the updating. In some embodiments, the value $\nu^*$ may be compared with one or more predetermined values, to determine how much the second adjustment factor should be adjusted in the updating. In some examples, if the value $\nu^*$ is below a first predetermined value, then the first predetermined value is used to update the second adjustment factor; if the value $\nu^*$ is above a second predetermined value larger than the first predetermined value, then the second predetermined value is used to update the second adjustment factor; if the value $\nu^*$ is between the first predetermined value and the second predetermined value; then the value $\nu^*$ itself is used to update the second adjustment factor.

In a second aspect, there is provided a system for facilitating encoding of video data. The system comprises: one or more processors, and memory storing one or more programs configured to be executed by the one or more processors, the one or more programs including instructions for performing the computer-implemented method of the first aspect. The one or more processors may include one or more CPU and one or more GPU operably coupled with each other. The system may further include one or more displays for displaying images or video associated with the video data or its processing.

In a third aspect, there is provided a non-transitory computer-readable storage medium storing one or more programs configured to be executed by one or more processors, the one or more programs including instructions for performing the computer-implemented method of the first aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree, such that "generally", "about", "substantially", or the like, are used, depending on context, to account for one or more of: manufacture tolerance, degradation, trend, tendency, imperfect practical condition(s), etc.

Unless otherwise specified, the terms "connected", "coupled", "mounted" or the like, are intended to encompass both direct and indirect connection, coupling, mounting, etc.

BRIEF DESCRIPTION OF THE DRAWINGS

Embodiments of the invention will now be described, by way of example, with reference to the accompanying drawings in which:

FIG. 2A is a graph showing rate-distortion relationship (mean squared error MSE vs bit-rate (bpp)) of a rate-distortion model in one embodiment of the invention and a hyperbolic model, for I-Slice of sequence "BQMall";

FIG. 2B is a graph showing rate-distortion relationship (mean squared error MSE vs bit-rate (bpp)) of a rate-distortion model in one embodiment of the invention and a hyperbolic model, for B-Slice of sequence "BQMall";

FIG. 2C is a graph showing rate-distortion relationship (mean squared error MSE vs bit-rate (bpp)) of a rate-distortion model in one embodiment of the invention and a hyperbolic model, for I-Slice of sequence "RitualDance";

FIG. 2D is a graph showing rate-distortion relationship (mean squared error MSE vs bit-rate (bpp)) of a rate-distortion model in one embodiment of the invention and a hyperbolic model, for B-Slice of sequence "RitualDance";

FIG. 5A is a graph showing rate-distortion performance (peak signal to noise ratio PSNR vs bit-rate) of the rate control algorithm of FIG. 1 in one implementation ("Proposed"), the default rate control algorithm in VTM-13.0 ("Default"), and the fixed-quantization parameter algorithm ("FixedQP"), all encoded with Random Access configuration in VTM-13.0, on processing sequence "Cactus";

FIG. 5B is a graph showing rate-distortion performance (peak signal to noise ratio PSNR vs bit-rate) of the rate control algorithm of FIG. 1 in one implementation ("Proposed"), the default rate control algorithm in VTM-13.0 ("Default"), and the fixed-quantization parameter algorithm ("FixedQP"), all encoded with Random Access configuration in VTM-13.0, on processing sequence "PartyScene";

FIG. 5C is a graph showing rate-distortion performance (peak signal to noise ratio PSNR vs bit-rate) of the rate control algorithm of FIG. 1 in one implementation ("Proposed"), the default rate control algorithm in VTM-13.0 ("Default"), and the fixed-quantization parameter algorithm ("FixedQP"), all encoded with Random Access configuration in VTM-13.0, on processing sequence "BasketballDrill";

FIG. 5D is a graph showing rate-distortion performance (peak signal to noise ratio PSNR vs bit-rate) of the rate control algorithm of FIG. 1 in one implementation ("Proposed"), the default rate control algorithm in VTM-13.0 ("Default"), and the fixed-quantization parameter algorithm ("FixedQP"), all encoded with Random Access configuration in VTM-13.0, on processing sequence "MarketPlace";

FIG. 6A is a graph showing rate-distortion performance (peak signal to noise ratio PSNR vs bit-rate) of the rate control algorithm of FIG. 1 in one implementation ("Proposed"), the default rate control algorithm in VTM-13.0 ("Default"), and the fixed-quantization parameter algorithm ("FixedQP"), all under Low Delay B configuration in VTM-13.0, on processing sequence "BasketballDrill";

FIG. 6B is a graph showing rate-distortion performance (peak signal to noise ratio PSNR vs bit-rate) of the rate control algorithm of FIG. 1 in one implementation ("Proposed"), the default rate control algorithm in VTM-13.0 ("Default"), and the fixed-quantization parameter algorithm ("FixedQP"), all under Low Delay B configuration in VTM-13.0, on processing sequence "FourPeople";

FIG. 6C is a graph showing rate-distortion performance (peak signal to noise ratio PSNR vs bit-rate) of the rate control algorithm of FIG. 1 in one implementation ("Proposed"), the default rate control algorithm in VTM-13.0 ("Default"), and the fixed-quantization parameter algorithm ("FixedQP"), all under Low Delay B configuration in VTM-13.0, on processing sequence "BasketballDrive";

FIG. 6D is a graph showing rate-distortion performance (peak signal to noise ratio PSNR vs bit-rate) of the rate control algorithm of FIG. 1 in one implementation ("Proposed"), the default rate control algorithm in VTM-13.0 ("Default"), and the fixed-quantization parameter algorithm ("FixedQP"), all under Low Delay B configuration in VTM-13.0, on processing sequence "PartyScene";

DETAILED DESCRIPTION

Figure 11:
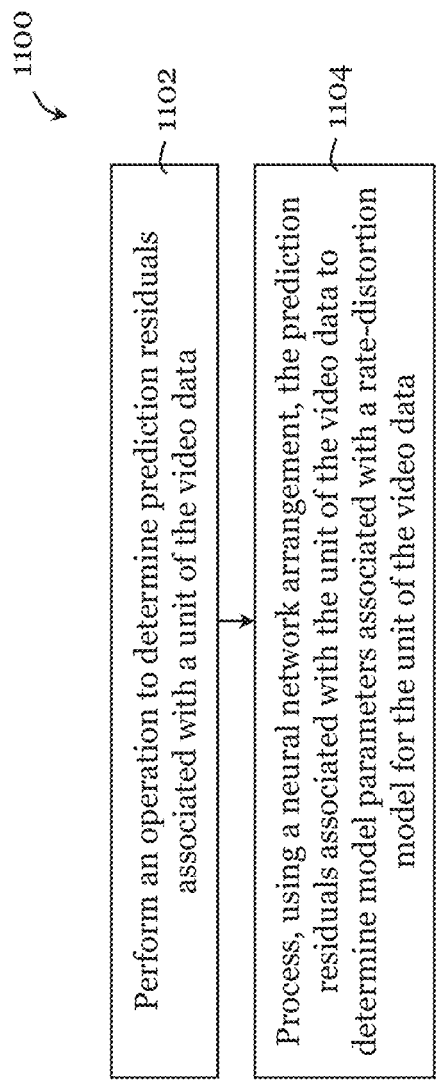
FIG. 11 is a flowchart illustrating a method for facilitating encoding of video data in some embodiments of the invention.

FIG. 11 illustrates a method 1100 for facilitating encoding of video data in some embodiments of the invention.

Method 1100 includes, in step 1102, performing an operation to determine prediction residuals associated with a unit of the video data.

In some embodiments, the video data (that includes the unit of the video data) includes data of a video with multiple frames. The unit of the video data may be a basic processing unit of the video data. For example, the unit of the video data may correspond to a coding tree unit of the video data, which is the basic processing unit of the High Efficiency Video Coding (HEVC) standard and the Versatile Video Coding (VVC) standard. In some embodiments, the operation in step 1102 includes partitioning the unit of the video data using one or more of the following partition schemes: quad-tree (QT), binary-tree (BT), or ternary-tree (TT). In some embodiments, the operation in step 1102 includes processing, using an encoder, part of the video data (which contains the unit of the video data) to determine prediction residuals associated with the unit of the video data. For example, the part of the video data may correspond to video data of a frame of the video. In some embodiments, the processing of the part of the video data (which contains the unit of the video data) determines prediction residuals associated with multiple units of the video data (one of which is the unit of the video data). The multiple units of the video data may relate to the same frame. In some examples, the encoder used for the processing is a Versatile Video Coding (VVC) based encoder, e.g., a VTM-13.0 encoder. In some other examples, the encoder used for the processing can be an encoder based on other video coding standard or may be an encoder based on other version of the Versatile Video Coding (VVC) standard.

Method 1100 also includes, in step 1104, processing, using a neural network arrangement, the prediction residuals associated with the unit of the video data, to determine model parameters associated with a rate-distortion (R-D) model for the unit of the video data. The model parameters are arranged to facilitate encoding of at least the unit of the video data.

In some embodiments, the model parameters include a bit-rate (or rate) related model parameter $\alpha$ and a distortion related model parameter $\beta$.

In some embodiments, the neural network arrangement used in step 1104 includes a neural network arrangement arranged to process the prediction residuals associated with the unit of the video data to determine the model parameters for intra-frame coding. For example, this neural network arrangement may include at least two neural networks, one arranged to process the prediction residuals associated with the unit of the video data to determine the bit-rate related model parameter $\alpha$ for intra-frame coding, and one arranged to process the prediction residuals associated with the unit of the video data to determine the distortion related model parameter $\beta$ for intra-frame coding. These two neural networks may respectively include a feature extractor and a regressor. In some examples, these two neural networks have substantially the same neural network structure (but may have different parameters, hyperparameters, etc.).

Additionally or alternatively, the neural network arrangement used in step 1104 includes a neural network arrangement arranged to process the prediction residuals associated with the unit of the video data to determine the model parameters for inter-frame coding. For example, this neural network arrangement may include at least two neural networks, one arranged to process the prediction residuals associated with the unit of the video data to determine the bit-rate related model parameter α for inter-frame coding, and one arranged to process the prediction residuals associated with the unit of the video data to determine the distortion related model parameter β for inter-frame coding. These two neural networks may respectively include a feature extractor and a regressor. In some examples, these two neural networks have substantially the same neural network structure (but may have different parameters, hyperparameters, etc.). In some examples, these two neural networks arranged to determine the model parameters for inter-frame coding and the two neural networks arranged to determine the model parameters for intra-frame coding all have substantially the same neural network structure (but may have different parameters, hyperparameters, etc.).

In some embodiments, the rate-distortion (R-D) model is representable as:

$$D = \frac{\alpha\beta}{R} + C_{DQ},$$

where R denotes bit-rate (or rate), D denotes distortion, and $C_{DQ}$ is a constant. The rate-distortion model may be formed based on a rate-quantization (R-Q) model and a distortion-quantization (D-Q) model. In some examples, the rate-quantization (R-Q) model is representable as:

$$R = \frac{\alpha}{Q},$$

where R denotes the bit-rate (or rate), Q denotes quantization step size, α is a model parameter, and Q denotes the quantization step size. In some examples, the distortion-quantization (D-Q) model is representable as: $D=\beta Q+C_{DQ}$, where D denotes distortion, Q denotes quantization step size, β is a model parameter, and $C_{DQ}$ is a constant.

Figure 12:
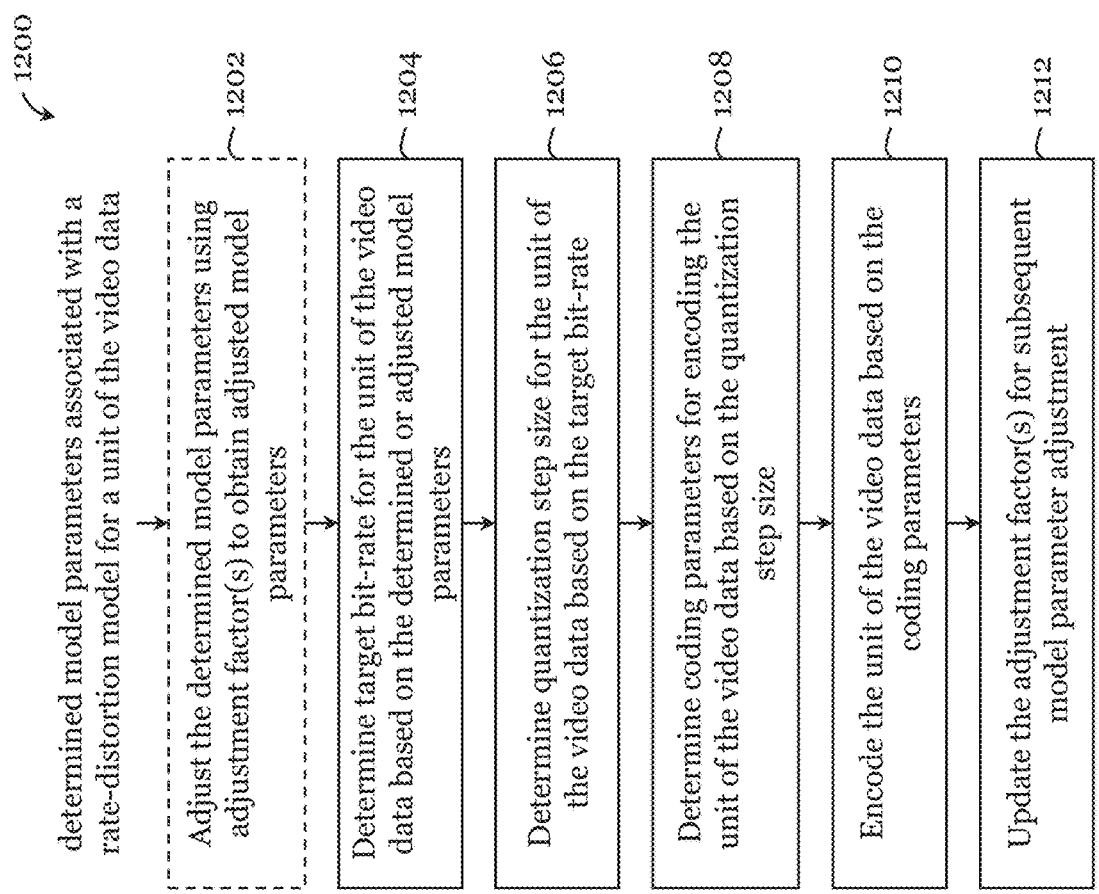
FIG. 12 is a flowchart illustrating a method for facilitating encoding of video data in some embodiments of the invention.

FIG. 12 illustrates a method 1200 for facilitating encoding of video data in some embodiments of the invention.

Method 1200 is performed based on determined model parameters associated with a rate-distortion model for a unit of the video data, such as the determined model parameters associated with a rate-distortion (R-D) model for the unit of the video data obtained in step 1104 of method 1100. Thus, in some embodiments, method 1200 may follow or continue from method 1100 (e.g., after step 1104).

Method 1200 includes, in step 1202, adjusting the determined model parameters using one or more adjustment factors to obtain adjusted model parameters. The adjusted model parameters are arranged to facilitate encoding of at least the unit of the video data. The value(s) of the one or more adjustment factors may depend on the performed encoding of a previous unit of the video data (e.g., the unit right before the unit of the video data to be encoded). In some embodiments, the adjusting in step 1202 includes adjusting the bit-rate related model parameter α using a first adjustment factor to obtain an adjusted bit-rate related model parameter $\alpha_i$ and/or adjusting the distortion related model parameter β using a second adjustment factor to obtain an adjusted distortion related model parameter $\beta_i$. Values of the first and second adjustment factors may be the same or different. For example, the adjusting of the bit-rate related model parameter α may include adjusting the bit-rate related model parameter α for inter-frame coding using the first adjustment factor to obtain an adjusted bit-rate related model parameter $\alpha_i$ for inter-frame coding or adjusting the bit-rate related model parameter α for intra-frame coding using the first adjustment factor to obtain an adjusted bit-rate related model parameter $\alpha_i$ for intra-frame coding. For example, the adjusting of the distortion related model parameter $\beta_i$ may include adjusting the distortion related model parameter β for inter-frame coding using the second adjustment factor to obtain an adjusted distortion related model parameter $\beta_i$ for inter-frame coding or adjusting the distortion related model parameter β for intra-frame coding using the second adjustment factor to obtain an adjusted distortion related model parameter $\beta_i$ for intra-frame coding. The adjustment of the bit-rate related model parameter α and/or the distortion related model parameter β for intra-frame may be different/separate from the adjustment of the bit-rate related model parameter α and/or the distortion related model parameter β for inter-frame.

Method 1200 includes, in step 1204, determining a target bit-rate for the unit of the video data based on the determined model parameters (e.g., if step 1202 is not performed, or if step 1202 is performed and the adjustment factor(s) do not actually change the model parameter(s)), or determining a target bit-rate for the unit of the video data based on the adjusted model parameters obtained in step 1202.

Method 1200 includes, in step 1206, determining a quantization step size for the unit of the video data based on the target bit-rate. In some embodiments, the determination of the quantization step size in step 1206 is based on:

$$Q_i = \frac{\alpha_i}{R_i},$$

where $Q_i$ is the quantization step size for the unit of the video data and $R_L$ is the target bit-rate for the unit of the video data.

Method 1200 includes, in step 1208, determining coding parameters for encoding the unit of the video data based on the quantization step size. In some embodiments, the coding parameters include a quantization parameter $QP_i$ and a Lagrangian parameter $\lambda_i$. In some embodiments, the determining of the coding parameters in step 1208 is based on $$QP_i = \left(\log_{X_1} Q_i\right) \times X_2 + X_3 \text{ and } \lambda_i = Y_1 \times Y_2^{\frac{QP_i}{Y_3}},$$

where $X_1$, $X_2$, $X_3$, $Y_1$, $Y_2$, $Y_3$ are all real numbers.

Method 1200 includes, in step 1210, encoding the unit of the video data based on the coding parameters. In some embodiments, the encoding of the unit of the video data is performed using Versatile Video Coding (VVC) based encoding technique. In some embodiments, the encoding of the unit of the video data is performed using other video coding standard based technique.

Method 1200 includes, after step 1210, in step 1212, updating the first adjustment factor to obtain an updated first adjustment factor for use in subsequent bit-rate related model parameter adjustment (e.g., for use in step 1202 for determined model parameters associated with a rate-distortion model for another unit of the video data) and/or updating the second adjustment factor to obtain an updated second adjustment factor for use in subsequent distortion related model parameter adjustment (e.g., for use in step 1202 for determined model parameters associated with a rate-distortion model for another unit of the video data). The updating of the first and/or second adjustment factors for the bit-rate related model parameter α and/or the distortion related model parameter β for intra-frame may be different/separate from the updating of the first and/or second adjustment factors for the bit-rate related model parameter α and/or the distortion related model parameter β for inter-frame.

In some embodiments, the updating of the first adjustment factor is based on an actual output bit-rate and an actual quantization step size associated with the encoding of the unit of the video data, and the bit-rate related model parameter α for the unit of the video data. For example, the updating of the first adjustment factor may be affected by a value μ* determined based on the actual output bit-rate and the actual quantization step size associated with the encoding of the unit of the video data, and the bit-rate related model parameter α for the unit of the video data. In some embodiments, the updating of the second adjustment factor is based on an actual output bit-rate and a Lagrangian parameter associated with the encoding of the unit of the video data, the updated first adjustment factor, and the bit-rate related model parameter α and the distortion related model parameter β for the unit of the video data. For example, the updating of the second adjustment factor may be affected by a value ν* determined based on the actual output bit-rate and the Lagrangian parameter associated with the encoding of the unit of the video data, the updated first adjustment factor, and the bit-rate related model parameter α and the distortion related model parameter β for the unit of the video data.

The values μ* and ν* may respectively affect how much the first and second adjustment factors should be adjusted in the respective updating. In some examples, the value μ* or ν* may be respectively compared with one or more predetermined values, to determine how much the first adjustment factor or the second adjustment factor should respectively be adjusted in the updating. In some examples, if the value μ* is below a first predetermined value, then the first predetermined value is used to update the first adjustment factor; if the value μ* is above a second predetermined value larger than the first predetermined value, then the second predetermined value is used to update the first adjustment factor; if the value μ* is between the first predetermined value and the second predetermined value; then the value μ* itself is used to update the first adjustment factor. In some examples, if the value ν* is below a first predetermined value, then the first predetermined value is used to update the second adjustment factor; if the value ν* is above a second predetermined value larger than the first predetermined value, then the second predetermined value is used to update the second adjustment factor; if the value ν* is between the first predetermined value and the second predetermined value; then the value ν* itself is used to update the second adjustment factor. The first and second predetermined values associated with value μ* can be different from the first and second predetermined values associated with value ν*.

The following disclosure provides some specific example implementations of the method 1100 and method 1200 in some embodiments of the invention.

Inventors of the present invention have realized, through their research, that a series of coding technologies have been adopted for the VVC standard. For example, to better adapt to the compression of high-resolution videos, the sizes of the Coding Tree Unit (CTU) and the maximum transform unit size are enlarged. For example, to capture characteristics of complex texture, flexible partition schemes such as quad-tree (QT), binary-tree (BT), ternary-tree (TT), etc. are used for Coding Unit (CU) partitioning. For example, to further remove spatial and temporal redundancies, both intra-prediction and inter-prediction are enhanced, by including more prediction modes and flexible combinations of different prediction tools. For example, multiple transform selection (MTS) and low-frequency non-separable transform (LFNST) are utilized for efficient energy compaction in the frequency domain. For example, trellis-coded quantization is employed to map the transform coefficients and associated quantization candidates within one block as a trellis-graph, and the path with the minimized rate-distortion (R-D) cost can be determined with Viterbi searching. For example, with the development of coding tools, size of Group-of-Pictures (GOP) is extended to better accommodate the compression of high frame-rate videos. For example, some low complexity algorithms are used to reduce the encoding complexity of VVC.

Inventors of the present invention have further realized, through their research, that rate control plays an important role in video coding. In one example, the VVC Test Model (VTM-13.0) (as disclosed in "VVC software VTM-13.0") adopts a modified λ-domain rate control that can provide improved reconstruction quality with the constrained bit-rate. The basic operation principle of this design makes use of coding information of previous frames within the same temporal level to infer model parameters of the current frame. Inventors of the present invention are aware that such estimation strategy assumes the current and previous frames share similar content and reference relationships, which, in practice, may not be suitable or correct, especially for video sequences with large motion and GOP size.

Inventors of the present invention have, through the research, learned about neural network based hybrid video coding. Specifically, inventors of the present invention are aware that neural network based video coding has become popular in recent years, and various deep learning based technologies for loop filter, intra and inter prediction, and entropy coding have been incorporated into the hybrid coding framework to improve coding performance. Inventors of the present invention are aware of various existing techniques. For example, due to good performance of convolutional neural network (CNN) in image restoration, He et al., "Enhancing HEVC compressed videos with a partition-masked convolutional neural network" (2018) uses a partition-masked CNN for decoder side quality enhancement, and as a result, blocking artifacts of the reconstructed frame can be effectively alleviated. For example, CNN structures such as enhanced deep convolutional neural networks (EDCNN) (as disclosed in Pan et al., "Efficient in-loop filtering based on enhanced deep convolutional neural networks for HEVC" (2020)) and dense residual convolutional neural network (DRN) (as disclosed in Wang et al., "Dense residual convolutional neural network based in-loop filter for HEVC" (2018)) can also accommodate for loop filters. For example, Mao et al., "Convolutional neural network based bi-prediction utilizing spatial and temporal information in video coding" (2019) teaches a spatiotemporal convolutional neural network (STCNN) for bi-predictor. In this design, the reference blocks, the spatial samples, conventional bi-predicted samples, and the side information are sent to STCNN for prediction, and this leads to more than 5% BD-Rate savings. For example, Yan et al., "Convolutional neural network-based fractional-pixel motion compensation" (2018) teaches neural network based motion compensation. Fractional-pixel reference generation CNN (FRCNN) is investigated by formulating fractional-pixel motion compensation as a regression problem. Inventors of the present invention have become aware of a series of neural network based coding tools for intra prediction and inter prediction. For example, Wang et al., "Multi-scale convolutional neural network-based intra prediction for video coding" (2019) teaches a multi-scale CNN for intra prediction, which treats angular prediction results and neighboring pixels as the input and can achieve up to 5.6% BD-Rate savings. For example, Sun et al., "Enhanced intra prediction for video coding by using multiple neural networks" (2020) teaches multiple neural network modes integrated with traditional modes defined in HEVC, and can achieve 2.6% BD-Rate savings. For example, Zhu et al., "Generative adversarial network-based intra prediction for video coding" (2019) uses a generative adversarial network (GAN) to remove the spatial redundancy in intra prediction. For example, Zhao et al., "Enhanced bi-prediction with convolutional neural network for high-efficiency video coding" (2018) uses CNN to enhance bi-prediction, hence to accurately infer the predictive signals, and can achieve up to 3% BD-Rate savings under Random Access configurations. Inventors of the present invention have become aware of the development of methods that aim to improve entropy coding efficiency. For example, Ma et al., "Convolutional neural network-based arithmetic coding for HEVC intra-predicted residues" (2019) teaches a CNN based arithmetic coding (CNNAC) for context modeling. In this design, the probability distribution of the syntax elements is directly estimated by CNN, and syntax element values and the estimated distribution are sent to a multi-level arithmetic codec.

Inventors of the present invention have also, through the research, learned about various rate and distortion models that can be used to describe the relationship between rate-distortion characteristics and coding parameters. For example, in Gish et al., "Asymptotically efficient quantizing" (1968), source codes are assumed to be uniformly distributed within each quantization interval, and a quadratic relationship between distortion D and quantization step size Q is derived as:

$$D = \frac{Q^2}{12} \quad (1)$$

However, with the development of video coding standards, source codes may not be subject to uniform distribution in practical application scenarios. Inventors of the present invention are also aware of distribution based rate-distortion models. Specifically, by modeling the distribution of transform coefficients, rate-quantization and distortion-quantization models can be derived by operating quantization. For example, various distributions such as Gaussian distribution, Laplacian distribution, and Cauchy distribution have been used for modeling coefficient distribution. Among these distribution based rate-distortion models, Laplacian distribution can achieve a good trade-off between the fitting accuracy and computational complexity. For example, Li et al., "Laplace distribution based Lagrangian rate distortion optimization for hybrid video coding" (2009) utilizes Laplacian distribution to model the residuals and close-forms for rate-quantization and distortion-quantization models are derived for λ-based optimization. For example, Ma et al., "Rate-distortion analysis for H.264/AVC video coding and its application to rate control" (2005) models the rate-quantization relationship as:

$$R = \frac{Z \cdot SAD}{Q} + R_h \quad (2)$$

where SAD denotes the sum of absolute difference of the motion-compensated micro-block, Z and $R_h$ represent model parameter and the number of header bits respectively. For example, the hyperbolic rate-distortion function is utilized due to its higher accuracy compared with conventional exponential RD function. For example, some existing encoders adopt an inverse proportional rate-quantization model, which can be combined with content complexity estimation.

Inventors of the present invention have also, through the research, learned about rate control, which aims to regularize the coding bit-rate and provides the best video quality under a constrained bit-rate budget. Inventors of the present invention are aware that rate control generally includes bit allocation and coding parameters derivation. Bit allocation attempts to distribute total bit-rates to achieve the optimal rate-distortion performance. For example, for GOP-level bit allocation, given the sequence level target bit-rate, each to-be-encoded GOP is allocated with the optimal coding bit-rate. At this stage, the allocation principle can be designed according to buffer status, sequence level rate-distortion optimization, and the output bit-rate. For example, frame level bit allocation is conducted within the current GOP, and the GOP level coding bit-rates are assigned to individual frames according to the associated temporal levels. For example, hierarchical allocation scheme (instead of uniform allocation) can be used to account for the hierarchical referencing structure. The basic idea of the hierarchical allocation scheme is that the frequently referenced frames can be assigned with more coding bit-rates to achieve overall performance gain. According to the allocation ratios among frames, frame level bit allocation can be categorized into fixed ratio bit allocation and adaptive bit allocation. Fixed ratio bit allocation, such as that disclosed in Li et al., "λ-domain rate control algorithm for high efficiency video coding" (2014), utilizes a pre-defined allocation ratio for frames in the current GOP. On the other hand, adaptive bit allocation considers distinct characteristics of each frame to adaptively adjust the allocation ratio. For example, Li et al., "λ-domain optimal bit allocation algorithm for high efficiency video coding" (2018) teaches an optimal allocation scheme given the rate-distortion relationship for each frame. By minimizing GOP level RD cost, the closed-form allocation ratio is derived by solving the optimization problem. For example, Mao et al., "High efficiency rate control for versatile video coding based on composite cauchy distribution" (2021) studies the dependencies among frames within a GOP, based on which the allocation ratio is determined according to an influence factor. For example, block-level bit allocation focuses on the bit-rate assignments to each block within the current frame. This process could be modeled as a convex optimization problem solved, such as in Li et al., "λ-domain optimal bit allocation algorithm for high efficiency video coding" (2018).

In respect of coding parameter estimation, inventors of the invention are aware that quantization parameter (QP) and Lagrangian parameter (λ) are used as coding parameters in some existing video codec, and generally three categories of algorithms exist. These three categories are: Q-domain rate control, ρ-domain rate control, and λ-domain rate control. Q-domain rate control algorithm establishes an effective model based on quantization parameter. Due to high model accuracy, and simplicity and convenience for model implementation, Q-domain rate control is used in commercial codec and reference software. For example, MPEG-2 adopts TM5 algorithm (for example, disclosed in "Coded representation of picture and audio information-MPEG-2 test model 5"), and MPEG-4 adopts VM8 method (for example, disclosed in Lee et al., "Scalable rate control for MPEG-4 video" (2000)). For example, x265 employs the Sum of Absolute Transformed Differences (SATD) based Rate-Quantization (R-Q) model, where SATD is employed to infer the content complexity. ρ-domain rate control, for example that disclosed in He et al., "Low-delay rate control for DCT video coding via ρ-domain source modeling" (2001), establishes a linear relationship between bit-rate and percentage of zero coefficients. ρ-domain rate control may provide improved coding performance but it cannot directly adapt to various coding block sizes. λ-domain rate control, for example that disclosed in Li et al., "λ-domain rate control algorithm for high efficiency video coding" (2014), considers the coding parameter λ. It is based on the idea that λ acts as an important factor controlling the coding behaviors in HEVC. Specifically, Li et al., "λ-domain rate control algorithm for high efficiency video coding" (2014) adopts a hyperbolic function to formulate the relationship between output bit-rate R and λ. An update scheme is used to ensure the accuracy of the model. λ-domain rate control, due to relatively high accuracy and relatively good coding performance, is integrated into the HEVC reference software. Rate control algorithm in VVC inherits from HEVC with minor modifications. For example, Li et al., "Rate control for VVC" (2018) teaches a rate control scheme for VVC in which CUs with skip and non-skip modes employ different updating strategies. For example, Liu et al., "AHG10: Quality dependency factor based rate control for VVC" (2019) teaches a quality dependency factor based rate control that leverages the dependency between frames. For example, in Ren et al., "AHG10: An improved VVC rate control scheme" (2022), to further improve the rate control algorithm in VVC, the coding tree unit-level bit allocation is refined by incorporating an accurate bit estimation method for the skip block, and an adaptive smooth window size is set according to GOP size and intra period (IP). In principle, neural networks could also be adopted for parameter estimation in rate control. For example, in Xu et al., "CNN-based rate-distortion modeling for H. 265/HEVC" (2017), a structural similarity (SSIM) based rate-distortion model for image datasets is predicted with CNNs. Taking the original frame as input, SSIM and bit-rate are predicted separately with two CNNs. For example, in Santamaria et al., "Estimation of rate control parameters for video coding using CNN" (2018), two CNNs are utilized to predict content characteristics in both global-scale and local-scale for intra-frames. For example, in Li et al., "A convolutional neural network-based approach to rate control in HEVC intra coding" (2017), parameters in the rate-distortion model are predicted by two CNNs separately. However, the above-mentioned methods are designed for intra-frame coding. For example, in Zhou et al., "Rate control method based on deep reinforcement learning for dynamic video sequences in HEVC" (2020), a Deep Reinforcement Learning (DRL) based rate control algorithm is used for dynamic video sequences in HEVC, which achieves enhanced rate control accuracy and performance improvements.

Turning now to the some embodiments of the invention. In some embodiments of the invention, there is provided a neural network based rate control scheme for facilitating video coding (video data coding). The scheme in these embodiments may provide relatively high accuracy models for different types of frames (e.g., I-frame, P-frame, B-frame). The scheme in these embodiments may adapt to the relatively large GOP size in VVC, which leads to improved rate-distortion performance. Some embodiments of the invention leverage the learning capability of neural networks and provide a neural network based rate control for enhancing rate-distortion performance for VVC.

Figure 1:
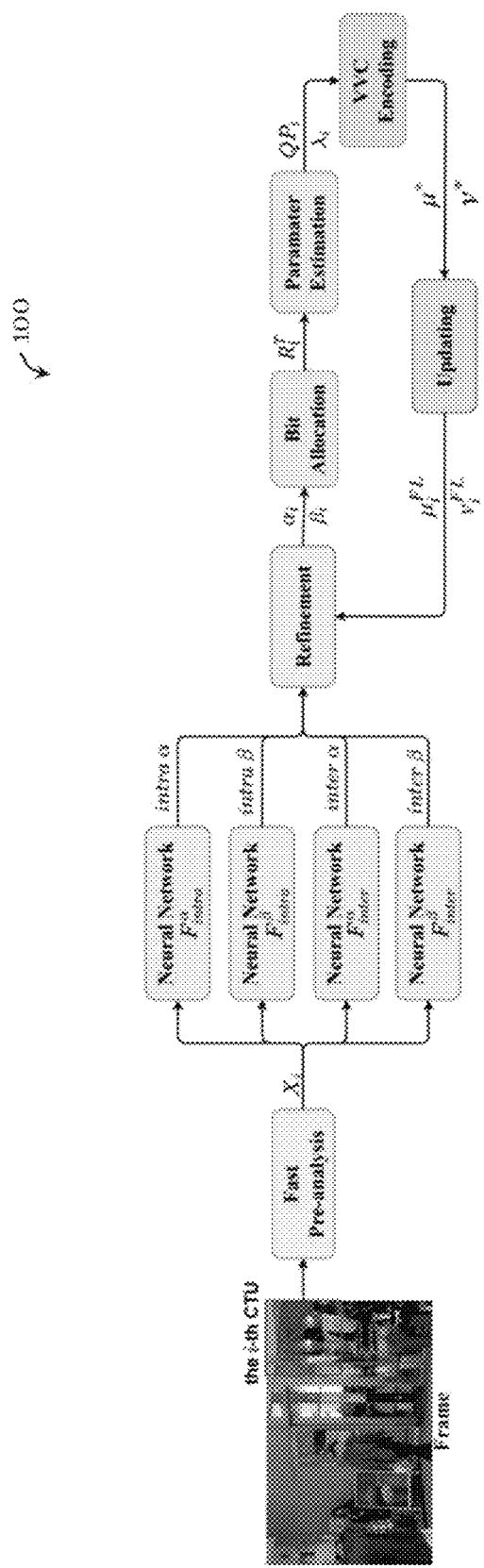
FIG. 1 is a schematic diagram illustrating operation of a rate control algorithm for video coding in one embodiment of the invention.

FIG. 1 illustrates operation 100 of a rate control algorithm for video coding (also referred to as video encoding) in one embodiment of the invention. The operation 100 may implement the method 1100 and the method 1200. The operation 100 generally includes performing an operation to determine prediction residuals associated with a unit (e.g., coding tree unit (CTU)) of the video data, and processing, using a neural network arrangement, the prediction residuals associated with the unit of the video data to determine model parameters associated with a rate-distortion model for the unit of the video data. The operation 100 also generally includes adjusting (e.g., refining) the determined model parameters using one or more adjustment factors to obtain adjusted model parameters, determining a target bit-rate for the unit of the video data based on the adjusted model parameters, determining a quantization step size for the unit of the video data based on the target bit-rate, determining coding parameters for encoding the unit of the video data based on the quantization step size, and encoding the unit of the video data based on the coding parameters.

Referring back to FIG. 1, in operation 100, a pre-analysis framework is used to process an input coding tree unit for obtaining characteristics of the input coding tree unit (e.g., prediction residuals associated with the input coding tree unit). A neural network arrangement with multiple neural networks are utilized to learn the rate-distortion model parameters from prediction residuals. The neural networks for inter-frame and the neural networks for intra-frame may be used selectively. Then based on the model parameters of each coding tree unit, bit allocation is performed within the current frame of the video, and optimal coding parameters are derived for each coding tree unit. Due to the more-accurate prediction of the rate-distortion relationship and more-intelligent coding tree unit level bit allocation, the operation 100 may deliver better rate-distortion performance and/or less bit-rate fluctuation (i.e., more stable bit rate).

One exemplary feature of some embodiments of the invention is the use of coding tree unit level pre-analysis, which extends analysis from pixel domain to residual domain, for different types of frames of a video (e.g., I-frame, P-frame, B-frame). The coding tree unit level pre-analysis process may provide relatively high prediction accuracy without introducing significant latency or even without introducing any latency. Another exemplary feature of some embodiments of the invention is a residual domain neural network based rate-distortion estimation scheme for VTM-13.0, which can take prediction residuals as input and estimate rate-distortion characteristics relatively accurately to facilitate rate control. Another exemplary feature of some embodiments of the invention is an implementation the rate control algorithm on VTM-13.0. Some embodiments of the invention may include multiple such exemplary features. Some embodiments of the invention may include one or more other exemplary features not specifically recited herein.

Table I lists the notations used in the following disclosure for some embodiments of the invention.

TABLE I

Notations for some embodiments of the invention

| Notation | Explanation |
|---|---|
| $\alpha_i$ and $\beta_i$ | Model parameters of the i-th coding tree unit |
| $C_{DQ}$ | Constant value in distortion-quantization (D-Q) model |
| $F_{intra}^{\alpha}$ | Neural network for predicting $\alpha$ of intra-frame |
| $F_{intra}^{\beta}$ | Neural network for predicting $\beta$ of intra-frame |
| $F_{inter}^{\alpha}$ | Neural network for predicting $\alpha$ of inter-frame |
| $F_{inter}^{\beta}$ | Neural network for predicting $\beta$ of inter-frame |
| $X_i$ | Extracted prediction residuals of the i-th coding tree unit |
| $Y_i$ | Parameter to be predicted of the i-th coding tree unit |
| $\alpha_i^{(p)}$ and $\beta_i^{(p)}$ | Model parameters predicted by neural networks |
| $\mu_i^{TL}$ and $v_i^{TL}$ | Refinement factors for $\alpha$ and $\beta$ |
| $R_i^{(o)}$ | Output bit-rate of the i-th coding tree unit |
| $\hat{\mu}_i^{TL}$ and $\hat{v}_i^{TL}$ | Updated refinement factors after encoding the i-th coding tree unit |
| $QP_i$ and $\lambda_i$ | Coding parameters of the i-th coding tree unit |
| $Q_i$ | Quantization step size of the i-th coding tree unit |
| $QP^{(f)}$ and $\lambda^{(f)}$ | Frame level coding parameters |
| $Q^{(f)}$ | Frame level quantization step size |
| $\lambda^{(c)}$ | Lagrangian multiplier used for coding tree unit level bit allocation |
| $R_i$ and $D_i$ | Target bit-rate and distortion for the i-th coding tree unit |
| $R^{(f)}$ | Target bit-rate for the frame |
| $K_i$ | Amount of coding tree units using the i-th coding tree unit as reference |
| $\Phi$ | Dependency factor for intra-frame |

Neural Network Based Parameter Estimation

In some existing rate control methods, rate-distortion relationships of the current frame are inferred from previous encoding statistics.

In some embodiments of the invention, a pre-analysis framework (e.g., shown in FIG. 1) is utilized to determine the rate-distortion characteristic of each frame, with which the prediction residuals can be extracted for analysis. Subsequently, the rate-distortion model parameters are estimated through neural networks (e.g., as shown in FIG. 1).

The following disclosure in this section concerns: the pre-analysis framework, the Rate-Quantization (R-Q) and Distortion-Quantization (D-Q) models (which may achieve good modeling accuracy), the neural network structure and training process, and an update scheme (that leverages the dynamically varying content for further improving accuracy).

Turning now to the pre-analysis framework.

In some embodiments, a pre-analysis framework is utilized to capture the content characteristics and coding behaviors of each frame. This pre-analysis process can be considered as a proxy encoding process, which facilitates rate control based on a combination of prior information of the current frame and historical encoding statistics of previous frames.

In this example, the proxy encoding process is implemented based on a VVC-based encoder, in particular a VTM-13.0 encoder. The input to the encoder is a frame to-be-encoded and the outputs are the prediction residuals relevant to the rate-distortion characteristics.

In the pre-analysis module, the low-complexity proxy encoding may lead to discrepancy between the actual and estimated residuals. Thus, it is preferred to achieve an optimal balance between computation complexity and estimation accuracy. Experiments are conducted to explore this aspect.

TABLE II

Example relationships among partition modes, computational complexity, and prediction accuracy

| *Partition Modes | Maximum Partition Depth | Encoding Complexity Ratio $T_{cost}$ | Prediction Accuracy $A_p$ |
|---|---|---|---|
| QT + BT + TT | 5 | 186.0% | 88.64% |
| QT + BT | 4 | 157.1% | 78.83% |
| QT | 4 | 118.3% | 73.11% |

*QT—Quad-tree; BT—Binary-tree; TT—Ternary-tree

Table II shows the relationship between partition modes used in the pre-analysis and the corresponding encoding time ratios. The encoding complexity ratio $T_{cost}$ is calculated as:

$$T_{cost} = \frac{T_p}{T_{w/op}} \times 100\% \quad (3)$$

where $T_p$ is the encoding time with pre-analysis and $T_{w/op}$ is the encoding time without pre-analysis. It is found that by limiting partition modes candidates, pre-analysis complexity can be efficiently reduced. In this embodiment, a partition-modes limited pre-analysis framework is used.

Table II also shows the prediction accuracy utilizing residuals generated by different combinations of partition modes. The prediction accuracy in this example is obtained based on the estimated bit-rate and actual bit-rate, wherein the estimated bit-rate is obtained based on the neural networks of this embodiment. The prediction accuracy $A_p$ can be calculated as:

$$A_p = \left(1 - \frac{|BR_p - BR_a|}{BR_a}\right) \times 100\% \quad (4)$$

where $BR_p$ is the coding tree unit level bit-rate predicted based on neural network generated parameters, $BR_a$ is the actual coding bit-rate, and $A_p$ is the prediction accuracy. It is found that by performing only QT in the pre-analysis, a satisfactory accuracy and complexity can be obtained. Thus, before actual encoding, the input frame is encoded with the pre-analysis process, and the associated quantization parameter is derived by the default rate control algorithm. In addition to the limiting of partition modes, compared with default Random Access configurations, several coding tools are disabled in the process. These tools include, e.g., dependent quantization (DepQuant) (e.g., disclosed in Schwarz et al., "Hybrid video coding with trellis-coded quantization" (2019)), MTS, LFNST (e.g., disclosed in Zhao et al., "Joint separable and non-separable transforms for next-generation video coding" (2018)), sub-block transform (SBT) (e.g., disclosed in Zhao et al., "Transform coding in the VVC standard" (2021)), adaptive loop filter (ALF) (e.g., disclosed in Tsai et al., "Adaptive loop filtering for video coding" (2013)) and deblocking filter (DF) (e.g., disclosed in Andersson et al., "Deblocking filtering in VVC" (2021)).

Turning now to the rate-quantization (R-Q) and distortion-quantization (D-Q) models.

In this example, the rate-quantization model can be expressed as $$R = \frac{\alpha}{Q} \quad (5)$$

where $\alpha$ is the model parameter and Q denotes the quantization step size. This model can well fit the rate-quantization relationship for codecs with only one parameter.

In this example, a linear function is adopted for the distortion-quantization model, which can be expressed as $$D = \beta Q + C_{DQ} \quad (6)$$

where $\beta$ is the model parameter and $C_{DQ}$ is a constant value.

By combining the rate-quantization mode and the distortion-quantization model, a rate-distortion model is derived as $$D = \frac{\alpha\beta}{R} + C_{DQ} \quad (7)$$

FIGS. 2A to 2D show rate-distortion relationship (mean squared error MSE vs bit-rate (bpp)) of the rate-distortion model in one embodiment of the invention and a hyperbolic model, for sequence "BQMall" I-Slice (FIG. 2A), sequence "BQMall" B-Slice (FIG. 2B), sequence "RitualDance" I-Slice (FIG. 2C), and sequence "RitualDance" B-Slice (FIG. 2D). Further information related to these sequences can be found in Bossen et al., "JVET common test conditions and software reference configurations for SDR video" (2020).

In these examples, the hyperbolic rate-distortion function (rate-distortion model, also referred to as the "hyperbolic model") can be described as:

$$D(R) = CR^{-K} \quad (8)$$

where C and K are model parameters.

It is observed that both the rate-distortion model in one embodiment of the invention and the hyperbolic model show satisfactory correlation coefficient $R^2$.

The sequence level rate-distortion performance of common test condition (CTC) sequences is modelled using equation (7). Correlation coefficient $R^2$ of the fitting results (under Random Access and Low Delay B configurations) are shown in Table III.

TABLE III

Correlation coefficient $R^2$ of fitting results using equation 7

| Class | *Sequence | Correlation Coefficient $R^2$ | |
| --- | --- | --- | --- |
| | | Random Access | Low Delay B |
| Class A1 | Tango2 | 0.9963 | — |
| | FoodMarket4 | 0.9988 | — |
| | Campfire | 0.9907 | — |
| Class A2 | CatRobot | 0.9988 | — |
| | DaylightRoad2 | 0.9998 | — |
| | ParkRunning3 | 0.9969 | — |

TABLE III-continued

Correlation coefficient $R^2$ of fitting results using equation 7

| Class | *Sequence | Correlation Coefficient $R^2$ | |
| --- | --- | --- | --- |
| | | Random Access | Low Delay B |
| Class B | MarketPlace | 0.9945 | 0.9923 |
| | RitualDance | 0.9996 | 0.9998 |
| | Cactus | 0.9999 | 0.9996 |
| | BasketballDrive | 0.9994 | 0.9989 |
| | BQTerrace | 0.9886 | 0.9647 |
| Class C | BasketballDrill | 0.9995 | 0.9985 |
| | BQMall | 0.9999 | 1.0000 |
| | PartyScene | 0.9975 | 0.9966 |
| | RaceHorses | 0.9988 | 0.9958 |
| Class D | BasketballPass | 0.9994 | 0.9995 |
| | BQSquare | 0.9997 | 0.9956 |
| | BlowingBubbles | 0.9980 | 0.9942 |
| | RaceHorses | 0.9986 | 0.9957 |
| Class E | FourPeople | — | 0.9955 |
| | Johnny | — | 0.9958 |
| | KristenAndSara | — | 0.9985 |

*Further information related to the sequences listed in Table III can be found in Bossen et al., "JVET common test conditions and software reference configurations for SDR video" (2020).

It is found that equation (7) can accurately model sequence level rate-distortion performance.

Furthermore, as $\lambda$ can be formulated as the slope of the optimal rate-distortion curve, the R-$\lambda$ relationship can be derived as:

$$\lambda = -\frac{\partial D}{\partial R} = \frac{\alpha\beta}{R^2} \quad (9)$$

In equation (9), only two parameters ($\alpha$, $\beta$) are involved for modeling the relationship between R and $\lambda$: $\alpha$ is related to output bit-rate whereas $\beta$ is related to distortion. These two parameters can be estimated using equations (5) and (6) through neural networks, which describe the relationship among quantization parameter, distortion, and bit-rate. Compared to directly predicting parameters of hyperbolic function in equation (8), in this embodiment, the quantization parameter (an important encoding parameter) is incorporated into rate-distortion modeling. As a result, more information can be involved for training the neural network and the trained neural network can better model the coding process. This in turn leads to higher estimation accuracy of model parameters.

Turning now to the neural network based rate-distortion (R-D) modeling.

In this embodiment, given the prediction residuals, neural networks are utilized to predict the model parameters ($\alpha$, $\beta$), as illustrated in operation 100 of FIG. 1. Since characteristics of prediction residuals extracted from inter and intra-frames are distinct from each other, the associated model parameters of intra and inter-frames are estimated using different neural networks. In this example, as shown in FIG. 1, four neural networks are used to predict parameters ($\alpha$, $\beta$) for intra and inter-frame respectively. These four neural networks are denoted as $F_{intra}{}^{\alpha}$, $F_{intra}\beta$, $F_{inter}{}^{\alpha}$, and $F_{inter}\beta$. While four neural networks are shown, in operation, the inter-frame neural networks and the intra-frame neural networks may be selectively used, i.e., either the inter-frame neural networks $F_{inter}{}^{\alpha}$ and $F_{inter}\beta$ are used to process the coding tree unit or the intra-frame neural networks $F_{intra}{}^{\alpha}$ and $F_{intra}\beta$ are used to process the coding tree unit. In this embodiment, the four neural networks have generally the same neural network structure, i.e., with a feature extractor and a regressor.

Figure 3:
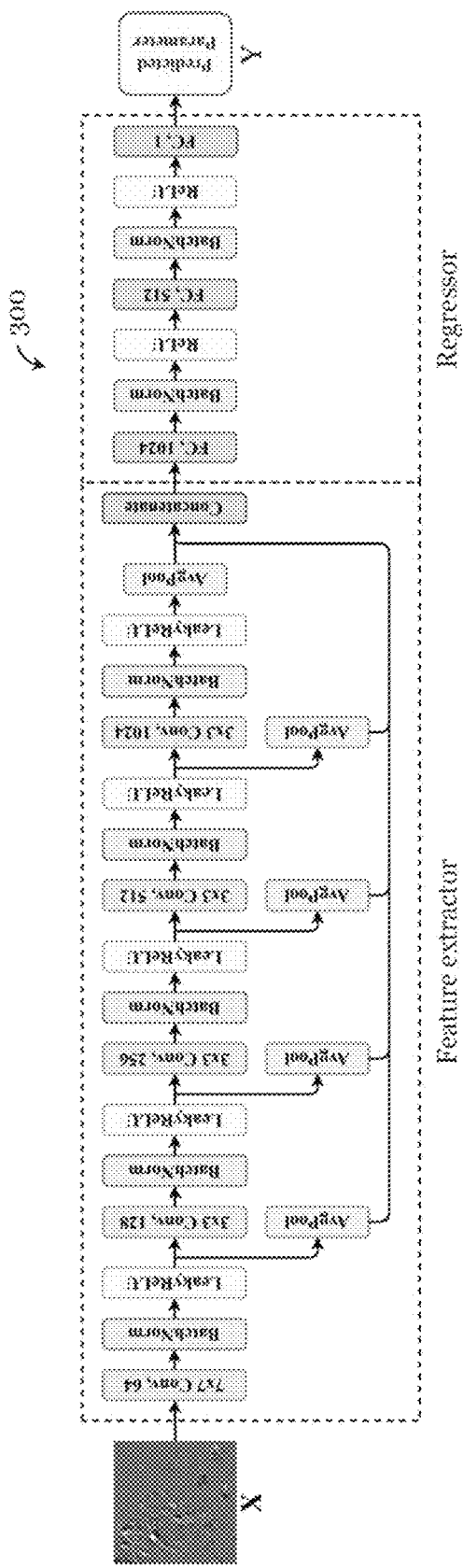
FIG. 3 is a schematic diagram illustrating a neural network structure for the neural networks used in the rate control algorithm of FIG. 1 in one embodiment of the invention.

FIG. 3 shows a neural network structure 300 for the neural networks used in the rate control algorithm of FIG. 1 in one embodiment. This neural network structure 300 is applicable to all four neural networks in FIG. 1 (i.e., the four neural networks may each have this neural network structure 300).

As shown in FIG. 3, the input of the neural network is the extracted prediction residuals, denoted as X, with a size of 128×128. The parameter to be predicted is denoted as a scalar Y. The neural network generally includes a feature extractor and a regressor operably coupled with the feature extractor. In operation, the residual patches are provided to the feature extractor. In this embodiment, the feature extractor includes five modules operably coupled in series. Each of the five modules respectively includes a convolutional layer, a batch normalization layer, a Leaky rectified linear unit, and an average pooling layer operably coupled in series. The convolutional layers of the second to fifth module are respectively coupled in series with the Leaky rectified linear unit of the first to fourth modules and in parallel with the average pooling layer of the first to fourth modules. In this example, the stride of five convolutional layers are set as 1, 2, 2, 2 and 2 respectively. For each 3×3 convolutional layer (the second to fifth convolutional layer), the input block is zero padded by one pixel to ensure fixed mapping size. For the 7×7 convolutional layer (the first convolutional layer), the input block is padded by three pixels. The average pooling layer of each of the five modules are operably coupled with the same concatenate layer. As a result, the extracted features from each convolutional stage are concatenated as output of the feature extractor and as input of the regressor. In this example, the regressor includes three full connection layers, two batch normalization layers, and two rectified linear units, arranged in the order as: full connection layer—batch normalization layer—rectified linear unit—full connection layer—batch normalization layer—rectified linear unit—full connection layer. The output of the regressor is the predicted parameter or scalar Y.

Training data for training the model is generated. In one example, BVI-DVC (as disclosed in Ma et al., "BVI-DVC: a training database for deep video compression" (2020)) is utilized for generating training data. In this example, 32 sequences are randomly selected from BVI-DVC, as shown in Table IV.

TABLE IV

Characteristics of BVI-DVC sequences used for generating training data in one example

| Class | Number of Sequences | Resolution | Frame Rate | Bit Depth |
|---|---|---|---|---|
| A | 8 | 4K | 25&30&60&120 | 10 |
| B | 8 | 1080p | 25&30&50&60&120 | 10 |
| C | 8 | 960 × 544 | 25&50&60&120 | 10 |
| D | 8 | 480 × 272 | 25&30&50&60&120 | 10 |

In this example, the first 64 frames of each sequence are encoded to generate training data. The selected sequences are encoded with Random Access fixed-quantization parameter configurations conforming to Common Test Conditions (CTCs) (as disclosed in Bossen et al., "JVET common test conditions and software reference configurations for SDR video" (2020)).

Figure 4:
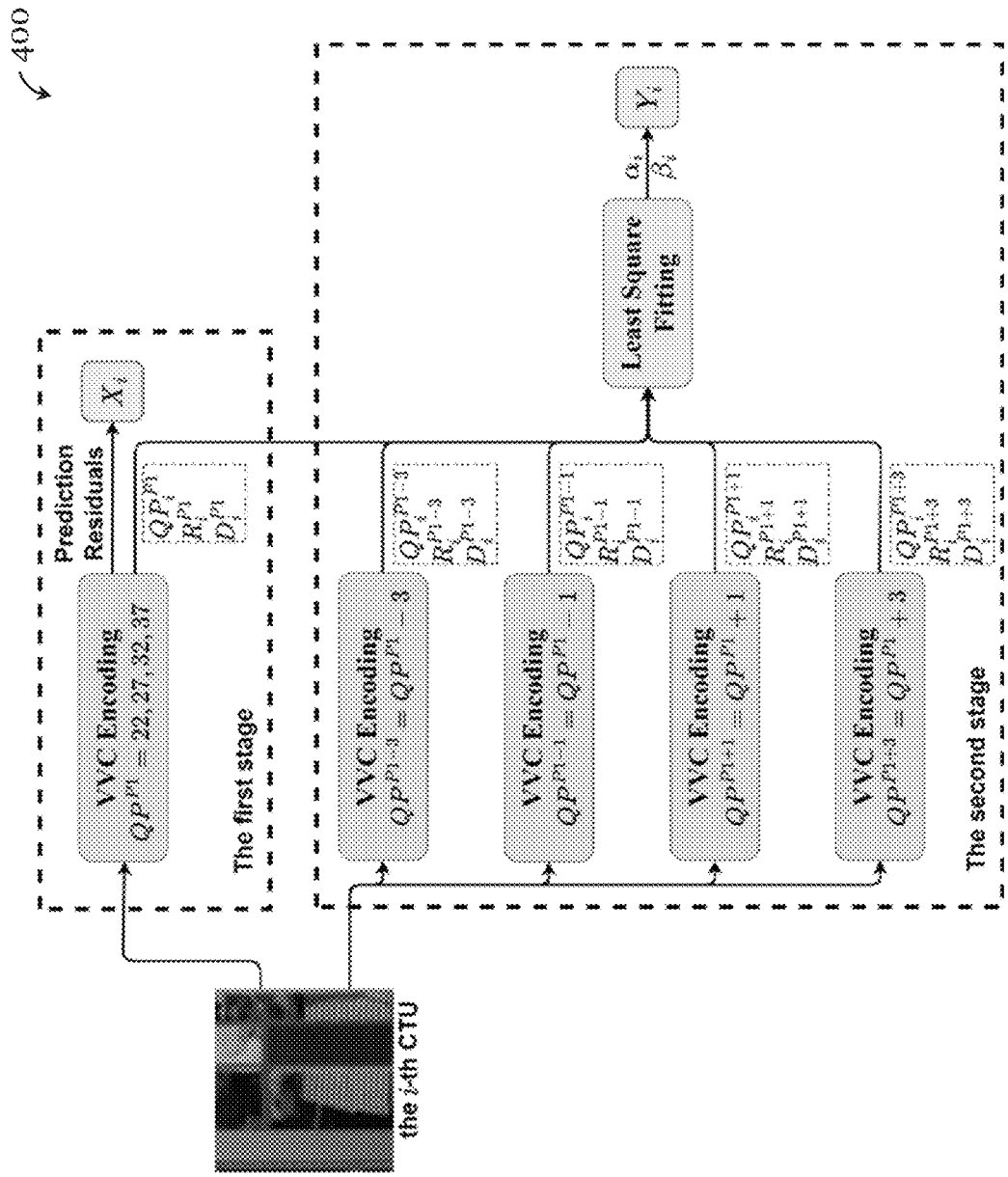
FIG. 4 is a schematic diagram illustrating an operation for generating training data for training the neural networks used in the rate control algorithm of FIG. 1 in one embodiment of the invention.

FIG. 4 shows an operation 400 for generating training data for training the neural networks used in the rate control algorithm of FIG. 1 in one embodiment of the invention. As shown in FIG. 4, in operation 400, multi-stage coding is utilized to generate the training data.

In this example, in the first stage, the sequences are encoded with quantization parameter that equals to $QP^{P1}$, where $QP^{P1}$ is set to 22, 27, 32 and 37 respectively. Prediction residuals of the i-th coding tree unit (128×128) are extracted, denoted as $X_i$. The corresponding bit-rate and distortion are denoted as $R_i^{P1}$ and $D_i^{P1}$. The actual encoding quantization parameter of the i-th coding tree unit in this step is denoted as $QP_i^{P1}$.

In this example, in the next stage, the sequences are encoded with quantization parameter equaling to $QP^{P1} + \Delta QP$. For each $QP^{P1}$, $\Delta QP$ varies as −3, −1, 1, and 3. The corresponding encoding quantization parameter for the i-th coding tree unit is denoted as $QP_i^{P1-3}, QP_i^{P1-1}, QP_i^{P1+1}$, and $QP_i^{P1+3}$ respectively. Accordingly, the output bit-rate and distortion can be expressed as $(RP_i^{P1-3}, D_i^{P1-3})$, $(R_i^{P1-1}, D_i^{P1-1})$, $(R_i^{P1+1}, D_i^{P1+1})$, and $(R_i^{P1+3}, D_i^{P1+3})$. Therefore, each sequence is encoded for 20 times with different quantization parameters. Given quantization parameter set $\{QP_i^{P1-3}, QP_i^{P1-1}, QP_i^{P1}, QP_i^{P1+1}, QP_i^{P1+3}\}$, bit-rate set $\{R_i^{P1-3}, R_i^{P1-1}, R_i^{P1}, R_i^{P1+1}, R_i^{P1+3}\}$, and distortion set $\{D_i^{P1-3}, D_i^{P1-1}, D_i^{P1}, D_i^{P1+1}, D_i^{P1+3}\}$, least square regression is utilized for fitting parameters in equations (5) and (6).

In this example, for the coding tree units in the frame boundaries, zero padding is applied to compensate these coding tree units. The fitted parameters of the i-th coding tree unit are denoted as $Y_i$. To ensure effectiveness of generated data, outlier data are dropped or removed (i.e., not used in training) to ensure the stability of neural network training.

The training process in this example is now presented.

With F representing the mapping of input and output of the neural network, the weighting parameter set of the neural network (ϵ) is estimated. Given a dataset including N pairs of $X_n$ and $Y_n$, the Mean Absolute Error (MAE) between label and predicted value is adopted as loss function. It can be expressed as $$L(\epsilon) = \frac{1}{N}\sum_{n=0}^{N-1} |F(X_n|\epsilon) - Y_n| \quad (10)$$

where N is the number of coding tree units in a batch.

In this example, the neural networks are trained using PyTorch on a NVIDIA GeForce RTX 2080Ti GPU. All the parameters are initialized using the method disclosed in He et al., "Delving deep into rectifiers: Surpassing human-level performance on ImageNet classification" (2015). Adam gradient descent algorithm (as disclosed in Kingma et al., "Adam: A method for stochastic optimization" (2014)) is applied for neural network optimization. Settings of hyper-parameters in this example are shown in Table V. In this example, the learning rate decays exponentially by a factor of 0.1 every 10 epochs during the training process.

TABLE V

Setting of hyperparameters

| Hyper-parameter | Value |
|---|---|
| Max Epochs | 80 |
| Batch Size | 80 |
| Learning Rate | 0.0001 |

In this embodiment, to improve prediction accuracy, the actual encoded information is used to adjust and refine (i.e., adjust) the parameter estimation. The main idea is that by utilizing the difference between predicted bit-rate and actual output bit-rate, the estimated parameters for following/subsequent frames can be dynamically adjusted. The refinement scheme includes two steps described below.

In relation to parameter refinement of the rate-quantization (R-Q) and distortion-quantization (D-Q) models, in this embodiment, given prediction residuals $X_i$, model parameters regarding the $\alpha_i^{(p)}$ and $\beta_i^{(p)}$ can be estimated through trained neural network as follows:

$$\alpha_i^{(p)} = F_{FT}^{\alpha}(X_i) \quad (11)$$

$$\beta_i^{(p)} = F_{FT}^{\beta}(X_i) \quad (12)$$

where i is the coding tree unit index and FT denotes the corresponding frame type, $\alpha_i^{(P)}$ and $\beta_i^{(P)}$ are predicted parameters for equations (5) and (6) respectively, and $F_{FT}^{\alpha}$ and $F_{FT}^{\beta}$ represent the trained neural network for each parameter with frame type FT.

The predicted parameters ($\alpha_i^{(p)}$, $\beta_i^{(p)}$) can be adjusted with refinement factors ($\mu_i^{TL}$, $v_i^{TL}$) as follows:

$$\alpha_i = \mu_i^{TL} \times \alpha_i^{(p)} \quad (13)$$

$$\beta_i = v_i^{TL} \times \beta_i^{(p)} \quad (14)$$

where $\alpha_i$ and $\beta_i$ are parameters for the i-th coding tree unit utilized in rate control, TL indicates the corresponding temporal layer, $\mu_i^{TL}$ and $v_i^{TL}$ are used for refining $\alpha_i$ and $\beta_i$, respectively, which are initialized to be 1 and could be further obtained according to coding tree unit index and temporal layer. The derivation and updating of $\mu_i^{TL}$ and $v_i^{TL}$ are as follows.

In relation to the update of the refinement factors, each time the codec completed encoding the i-th coding tree unit, the refinement factor $\mu_i^{TL}$ is updated as follows $$\hat{\mu}_i^{TL} = 0.5 \times (\mu_i^{TL} + \mu^*) \quad (15)$$

where $\mu^*$ is derived as $$\mu^* = \begin{cases} \frac{1}{3}, & \mu_{temp} < \frac{1}{3} \\ \mu_{temp}, & \frac{1}{3} \leq \mu_{temp} \leq 3 \\ 3, & \mu_{temp} > 3 \end{cases} \quad (16)$$

$$\mu_{temp} = \frac{R_i^{(o)} \times Q_i}{\alpha_i^{(p)}} \quad (17)$$

where $R_i^{(o)}$ is output bit-rate and $Q_i$ is the actual quantization step size for the i-th coding tree unit. $\hat{\mu}_i^{TL}$ denotes the updated parameter of $\mu_i^{TL}$ and is utilized for future $\alpha_i$ refinement on the same temporal layer.

Since the distortion-quantization model in equation (6) involves a constant $C_{DQ}$, the associated refinement factor $v_i^{TL}$ cannot be updated directly based on distortions. Combined with equation (9), the updating of $v_i^{TL}$ is as follows:

$$\hat{v}_i^{TL} = 0.5 \times (v_i^{TL} + v^*) \quad (18)$$

where $v^*$ is derived as $$v^* = \begin{cases} \frac{1}{3}, & v_{temp} < \frac{1}{3} \\ v_{temp}, & \frac{1}{3} \leq v_{temp} \leq 3 \\ 3, & v_{temp} > 3 \end{cases} \quad (19)$$

$$v_{temp} = \frac{R_i^{(o)}}{\sqrt{\frac{\hat{\mu}_i^{TL} \cdot \alpha_i^{(p)} \cdot \beta_i^{(p)}}{\lambda_i}}}$$

$$v^* = \begin{cases} \frac{1}{3}, & v_{temp} < \frac{1}{3} \\ v_{temp}, & \frac{1}{3} \leq v_{temp} \leq 3 \\ 3, & v_{temp} > 3 \end{cases} \quad (20)$$

$$v_{temp} = \frac{R_i^{(o)}}{\sqrt{\frac{\hat{\mu}_i^{TL} \cdot \alpha_i^{(p)} \cdot \beta_i^{(p)}}{\lambda_i}}}$$

where $\lambda_i$ is the Lagrangian parameter when calculating rate-distortion cost of the i-th coding tree unit.

Analogous $\mu_i^{TL}$, $v_i^{TL}$ denotes the updated refinement factor of $v_i^{TL}$. $v_i^{TL}$ is utilized to refine $\beta_i$ for the following frame on the same temporal layer. According to the equation, $v_i^{TL}$ is updated after $\mu_i^{TL}$ is calculated.

Experiments are conducted to verify the effectiveness of the refinement scheme disclosed above.

Table VI shows the calculated average bits error per coding tree unit $\Delta \bar{R}$ of nine sequences in Class B and Class C. The average bits error $\Delta \bar{R}$ is defined as $$\Delta \bar{R} = \frac{\sum_{i=0}^{N_f - 1} |Bits_i^p - Bits_i^a|}{N_f * N_{CTU}} \quad (21)$$

where $N_f$ is the number of frames in the sequence, $N_{CTU}$ is the number of coding tree units within a frame, and $Bits_i^v$ and $Bits_i^a$ are predicted bits and actual coding bits of the i-th frame. $\Delta \bar{R}$ of the bit estimation method in this embodiment with refinement, the bit estimation method in this embodiment without refinement, and the method disclosed in Li et al., "Rate control for VVC" (2018) ("Li's method") are compared. It is found that the refinement scheme can efficiently improve bit estimation accuracy.

TABLE VI

Illustration of average bits error per coding tree unit $\Delta \bar{R}$ of bit estimation with refinement compared with bit estimation without refinement and Li's method

| | | Average bits error per coding tree unit $\Delta \bar{R}$ | | |
| --- | --- | --- | --- | --- |
| Class | *Sequence | Proposed method in one embodiment with refinement | Proposed method in one embodiment without refinement | Li's method |
| Class B | MarketPlace | 117.18 | 130.44 | 137.33 |
| | RitualDance | 88.10 | 107.28 | 136.90 |

TABLE VI-continued

Illustration of average bits error per coding tree unit $\Delta \overline{R}$ of bit estimation with refinement compared with bit estimation without refinement and Li's method

| Class | *Sequence | Average bits error per coding tree unit $\Delta \overline{R}$ | | |
|---|---|---|---|---|
| | | Proposed method in one embodiment with refinement | Proposed method in one embodiment without refinement | Li's method |
| | Cactus | 120.77 | 132.32 | 140.73 |
| | BasketballDrive | 117.04 | 135.52 | 197.09 |
| | BQTerrace | 152.61 | 150.94 | 124.80 |
| Class C | BasketballDrill | 446.23 | 506.41 | 781.41 |
| | BQMall | 366.50 | 441.55 | 425.63 |
| | Partyscene | 536.51 | 582.89 | 488.52 |
| | RaceHorses | 728.23 | 802.28 | 1041.82 |
| | Overall | 176.10 | 195.62 | 223.79 |

Further information related to the sequences listed in Table VI can be found in Bossen et al., "JVET common test conditions and software reference configurations for SDR video" (2020).

Rate Control

In this embodiment, rate control is conducted at coding tree unit level with the assistance of the disclosed rate-distortion modeling.

In this example, the GOP level bit-rate allocation and frame level bit-rate allocation in the default scheme of VTM-13.0 are employed. After analyzing the whole frame, the coding tree unit-level rate-distortion models are established within the current frame. Given frame level target bit-rate $R^{(f)}$, frame level quantization parameter is derived. Subsequently, coding tree unit level bit allocation is conducted. Coding parameters for each coding tree unit can then be obtained.

Turning now to the derivation of frame level coding parameters.

In this embodiment, frame level target bit-rate $R^{(f)}$ equals to the sum of the bit-rate of individual coding tree unit within the current frame, which is given by $$R^{(f)} = \frac{\sum_{i=0}^{N-1} \alpha_i}{Q^{(f)}} \quad (22)$$

where N is the amount of coding tree units in a frame and $Q^{(f)}$ denotes the frame level quantization step size. $Q^{(f)}$ can be calculated as $$Q^{(f)} = \frac{\sum_{i=0}^{N-1} \alpha_i}{R^{(f)}} \quad (23)$$

The corresponding frame level quantization parameter ($QP^{(f)}$) is obtained by $$QP^{(f)} = (\log_2 Q^{(f)}) \times 6 + 4 \quad (24)$$

To ensure robustness of rate control, in this embodiment, a fixed $\lambda$-quantization parameter relationship is used, which is calculated as $$\lambda^{(f)} = 0.57 \times 2.0^{\frac{QP^{(f)}}{3.0}} \quad (25)$$

The obtained frame level coding parameter $QP^{(f)}$ can be represented in picture parameter set (PPS) and be further entropy encoded. The frame level $\lambda(\lambda^{(f)})$ is utilized for constraining range of $\lambda_i$ for the i-th coding tree unit.

Turning now to the coding tree unit level bit allocation.

In this embodiment given frame level target bit-rate $R^{(f)}$, bit-rate budgets are assigned to each coding tree unit within the current frame. Meanwhile, the total distortions are minimized under the constrained bit-rate. Such process can be formulated as follows:

$$\min_{R_0, R_2, \ldots, R_{N-1}} \sum_{i=0}^{N-1} D_i(R_i), \quad (26)$$

$$\text{s.t.} \sum_{i=0}^{N-1} R_i \leq R^{(f)}$$

where $D_i$ and $R_i$ are bit-rate and distortion for the i-th coding tree unit respectively. The constraint problem can be converted as unconstrained one with Lagrangian multipliers as follows:

$$J = \sum_{i=0}^{N-1} D_i(R_i) + \lambda^{(c)} \sum_{i=0}^{N-1} R_i \quad (27)$$

where J is the rate-distortion cost of one frame and $\lambda^{(c)}$ denotes the Lagrangian multiplier used for this optimization problem.

For inter-frame coding tree units, assuming there are no dependencies between coding tree units within the same frame, the solution given in Li et al., "λ-domain optimal bit allocation algorithm for high efficiency video coding" (2018) is as follows $$\lambda_0^{(c)} = \lambda_1^{(c)} = \ldots = \lambda_{N-1}^{(c)} = \lambda^{(c)} \quad (28)$$

where $\lambda_i^{(c)}$ denotes $\lambda$ utilized in bit allocation for the i-th coding tree unit.

Since $\lambda$ is the slope of rate-distortion curve, by combining equations (28) and (9), the following can be obtained:

$$R^{(f)} = \sum_{i=0}^{N-1} \left(\frac{\alpha_i \beta_i}{\lambda^{(c)}}\right)^{\frac{1}{2}} \quad (29)$$

$$\lambda^{(c)} = \frac{\left(\sum_{i=0}^{N-1} \sqrt{\alpha_i \beta_i}\right)^2}{\left(R^{(f)}\right)^2} \quad (30)$$

Therefore, the target bit-rate for each inter-frame coding tree unit can be derived as:

$$R_i = \left(\frac{\alpha_i \beta_i}{\lambda(c)}\right)^{\frac{1}{2}} \quad (31)$$

Regarding all intra-frame, the coding tree unit may use the neighboring coding tree units as reference, forming dependencies among coding tree units. Suppose the reference samples of the i-th coding tree unit locate in i-th coding tree unit, the dependency factor (e.g., disclosed in Mao et al., "High efficiency rate control for versatile video coding based on composite cauchy distribution" (2021)) is defined as:

$$\pi_j^i = \frac{\partial J_i}{\partial D_j} \quad (32)$$

$$J_i = D_i + \lambda^{(c)} R_i \quad (33)$$

where $J_i$ is the rate-distortion cost of the i-th coding tree unit and $D_j$ is the distortion of the i-th coding tree unit. The factor $\pi_j^i$ is assumed to be a constant factor denoted as $\Phi$. Then, the partial derivation of J defined in equation (27) with respect to $D_j$ can be computed and set to o as follows:

$$\frac{\partial J}{\partial D_j} = \sum_{i=0}^{N-1} \frac{\partial J_i}{\partial D_j} = 0, j = 0, 1, 2, \ldots, N-1 \quad (34)$$

$$\frac{\partial J}{\partial D_j} = 1 + K_j \Phi + \lambda^{(c)} \frac{\partial R_j}{\partial D_j} = 0 \quad (35)$$

where $K_j$ is the amount of coding tree units using the j-th coding tree unit as reference. By combining equations (35) and (7), the target bit-rate for the i-th coding tree unit can be calculated as:

$$R_i = \left( \frac{(1 + K_i \Phi) \alpha_i \beta_i}{\lambda^{(c)}} \right)^{\frac{1}{2}} \quad (36)$$

By summing up for various coding tree units and setting it to equal to $R^{(f)}$, $\lambda^{(c)}$ can be obtained as $$R^{(f)} = \sum_{i=0}^{N-1} \left( \frac{(1 + K_i \Phi) \alpha_i \beta_i}{\lambda^{(c)}} \right)^{\frac{1}{2}} \quad (37)$$

$$\lambda^{(c)} = \frac{\left( \sum_{i=0}^{N-1} \sqrt{(1 + K_i \Phi) \alpha_i \beta_i} \right)^2}{\left( R^{(f)} \right)^2} \quad (38)$$

Turning now to the derivation of coding tree unit level coding parameters.

In this embodiment, given a target bit-rate $R_i$ for the i-th coding tree unit, the quantization step size can be derived as:

$$Q_i = \frac{\alpha_i}{R_i} \quad (39)$$

Subsequently, the associated coding parameters ($QP_i$, $\lambda_i$) of the i-th coding tree unit are calculated as:

$$QP_i = (\log_2 Q_i) \times 6 + 4 \quad (40)$$

$$\lambda_i = 0.57 \times 2.0^{\frac{QP_i}{3.0}} \quad (41)$$

Experiment Results

The rate control algorithm in this embodiment is implemented on VTM-13.0, following the CTCs disclosed in Bossen et al., "JVET common test conditions and software reference configurations for SDR video" (2020). In this example, Random Access configurations (GOP size=32) and Low Delay B configurations (GOP size=8) are employed. Details of test sequences used in the experiments are listed in Table VII.

TABLE VII

Characteristics of test sequences used in the example experiments

| Class | Number of Sequences | Resolution | Frame Rate | Bit Depth | Intra Period |
|---|---|---|---|---|---|
| A1 | 3 | 4K | 60&30 | 10 | 64&32 |
| A2 | 3 | 4K | 60&50 | 10 | 64 |
| B | 5 | 1080p | 60&50 | 8&10 | 64 |
| C | 4 | WVGA | 60&50&30 | 8 | 64&32 |
| D | 4 | WQVGA | 60&50&30 | 8 | 64&32 |
| E | 3 | 720p | 60 | 8 | — |

In this example, the neural network is integrated with LibTorch which can operate on a CPU platform. All experiments are conducted on a dual Intel Xeon CPU E5-2620 platform without parallelism. The test sequences are first encoded with fixed-quantization parameter configurations, setting quantization parameter to 22, 27, 32, and 37 respectively. The obtained output bit-rates are set as the corresponding target bit-rates for rate control. Moreover, the rate control in this embodiment is only applied to lower temporal layers, and the highest temporal layer employs the default rate control method. BD-Rate (as disclosed in Bjontegaard, "Improvements of the BD-PSNR model" (2008)) is used to evaluate coding performance of algorithm in this embodiment. BitErr is calculated to measure accuracy of output bit-rate as follows:

$$BitErr = \frac{|R^{(o)} - R^{(t)}|}{R^{(t)}} \times 100\% \quad (42)$$

where $R^{(o)}$ is the output bit-rate and $R^{(t)}$ is the corresponding target bit-rate. The encoding computational complexity is calculated as follows:

$$T_{Enc} = \frac{T_{proposed}}{T_{anchor}} \quad (43)$$

where $T_{proposed}$ is total encoding time of the proposed method in this embodiment and $T_{anchor}$ is the encoding time of anchor method.

Rate-distortion performance is determined. Table VIII, Table IX, and Table X show the overall performance of proposed algorithm in this embodiment on VTM-13.0.

In one experiment, the BD-rate of the proposed rate control scheme in one embodiment is compared with the default method in VTM-13.0 (as anchor) and Ren et al.'s method (as anchor). Comparisons are made under Random Access and Low Delay B configurations. The related results are shown in Table VIII.

In one experiment, the BD-rate and bit-rate error of rate control algorithms of the proposed method in one embodiment, the default method in VTM-13.0, and Ren et al.'s method when they are compared with fixed-quantization parameter algorithm (all under VTM-13.0 Random Access configurations). The related results are shown in Table IX.

In one experiment, the BD-rate and bit-rate error of rate control algorithms of the proposed method in one embodiment, the default method in VTM-13.0, and Ren et al.'s method when they are compared with fixed-quantization parameter algorithm (all under VTM-13.0 Low Delay B configurations). The related results are shown in Table X.

TABLE VIII

Illustration of the BD-rate of the proposed rate control scheme in one embodiment under Random Access and Low Delay B configurations when compared with the default method in VTM-13.0 (as anchor) and Ren et al.'s method (as anchor)

| | | Random Access | | Low Delay B | |
|---|---|---|---|---|---|
| Class | *Sequence | Default method as anchor | Ren et al.'s method as anchor | Default method as anchor | Ren et al.'s method as anchor |
| Class A1 | Tango2 | −2.79% | −1.57% | | |
| | FoodMarket4 | −4.48% | −1.55% | | |
| | Campfire | −6.09% | 4.44% | | |
| Class A2 | CatRobot | −0.62% | 0.68% | | |
| | DaylightRoad2 | −0.26% | 0.93% | | |
| | ParkRunning3 | −1.37% | −1.28% | | |
| Class B | MarketPlace | −3.88% | −2.24% | 0.40% | 0.42% |
| | RitualDance | −0.45% | −0.21% | −1.73% | −1.69% |
| | Cactus | −1.98% | −1.02% | 1.39% | 1.81% |
| | BasketballDrive | −0.34% | 0.06% | −1.93% | −1.87% |
| | BQTerrace | 0.63% | 2.06% | 0.62% | 1.08% |
| Class C | BasketballDrill | −2.84% | −2.11% | −2.50% | −2.27% |
| | BQMall | 0.83% | 1.01% | −0.28% | −0.10% |
| | Partyscene | −1.83% | −1.47% | −2.27% | −2.32% |
| | RaceHorses | −1.08% | −1.56% | −0.47% | −0.32% |
| Class D | BasketballPass | −0.08% | 0.05% | −0.19% | −0.34% |
| | BQSquare | −0.12% | 0.62% | −1.32% | −1.01% |
| | BlowingBubbles | −0.20% | 0.01% | −0.18% | −0.16% |
| | RaceHorses | 0.19% | −0.22% | 0.36% | 0.43% |
| Class E | FourPeople | — | — | −1.18% | −0.19% |
| | Johnny | — | — | −0.19% | 1.60% |
| | KristenAndSara | — | — | −1.15% | 0.27% |
| | Overall | −1.77% | −0.25% | −0.77% | −0.30% |

*Further information related to the sequences listed in Table VIII can be found in Bossen et al., "JVET common test conditions and software reference configurations for SDR video" (2020).

TABLE IX

Illustration of the BD-rate and bit-rate error BitErr of rate control algorithms (of the proposed method in one embodiment, the default algorithm in VTM-13.0, and Ren et al.'s method) when compared with the fixed-quantization parameter algorithm (all under VTM-13.0 Random Access configurations)

| | | Proposed method | | Default algorithm in VTM-13.0 | | Ren et al.'s method | |
|---|---|---|---|---|---|---|---|
| Class | *Sequence | BD-Rate | BitErr | BD-Rate | BitErr | BD-Rate | BitErr |
| Class A1 | Tango2 | 7.86% | 0.13% | 11.11% | 0.14% | 9.75% | 0.14% |
| | FoodMarket4 | 15.49% | 0.10% | 20.64% | 0.13% | 17.14% | 0.12% |
| | Campfire | 16.56% | 0.09% | 24.04% | 0.02% | 11.50% | 0.29% |
| Class A2 | CatRobot | 9.71% | 0.23% | 10.26% | 0.22% | 8.87% | 0.20% |
| | DaylightRoad2 | 11.37% | 0.14% | 11.36% | 0.10% | 10.16% | 0.12% |
| | ParkRunning3 | 2.08% | 0.03% | 3.49% | 0.02% | 3.39% | 0.02% |
| Class B | Marketplace | −0.57% | 0.12% | 3.22% | 0.14% | 1.54% | 0.14% |
| | Ritual Dance | 4.10% | 0.11% | 4.56% | 0.11% | 4.31% | 0.11% |
| | Cactus | 6.54% | 0.17% | 8.59% | 0.20% | 7.58% | 0.19% |
| | BasketballDrive | 4.61% | 0.10% | 4.96% | 0.12% | 4.54% | 0.12% |
| | BQTerrace | 10.13% | 0.65% | 9.11% | 0.50% | 7.82% | 0.84% |
| Class C | BasketballDrill | 1.63% | 0.18% | 4.56% | 0.28% | 3.79% | 0.29% |
| | BQMall | 3.04% | 0.34% | 2.20% | 0.40% | 2.02% | 0.39% |
| | PartyScene | 3.55% | 0.13% | 5.51% | 0.24% | 5.10% | 0.23% |
| | RaceHorses | 1.53% | 0.15% | 2.62% | 0.16% | 3.09% | 0.45% |
| Class D | BasketballPass | 1.88% | 0.42% | 1.97% | 0.53% | 1.84% | 0.50% |
| | BQSquare | 11.09% | 1.39% | 11.22% | 1.26% | 10.49% | 1.23% |
| | BlowingBubbles | 8.83% | 1.02% | 9.00% | 0.84% | 8.79% | 0.85% |
| | RaceHorses | 4.58% | 0.57% | 4.33% | 0.48% | 4.90% | 1.38% |
| | Overall | 6.51% | 0.18% | 8.41% | 0.19% | 6.71% | 0.24% |
| | $T_{Enc}$ | 122.22% | | 99.28% | | 102.75% | |

*Further information related to the sequences listed in Table IX can be found in Bossen et al., "JVET common test conditions and software reference configurations for SDR video" (2020).

TABLE X

Illustration of the BD-rate and bit-rate error BitErr of rate control algorithms (of the proposed method in one embodiment, the default algorithm in VTM-13.0, and Ren et al.'s method) when compared with the fixed-quantization parameter algorithm (all under VTM-13.0 Low Delay B configurations)

| Class | *Sequence | Proposed Method BD-Rate | Proposed Method BitErr | Default algorithm in VTM-13.0 BD-Rate | Default algorithm in VTM-13.0 BitErr | Ren et al.'s Method BD-Rate | Ren et al.'s Method BitErr |
|---|---|---|---|---|---|---|---|
| Class B | Marketplace | −11.43% | 0.12% | −11.43% | 0.12% | −11.45% | 0.12% |
| | RitualDance | −1.35% | 0.09% | 0.39% | 0.10% | 0.34% | 0.09% |
| | Cactus | 1.59% | 0.11% | 0.24% | 0.11% | −0.13% | 0.11% |
| | BasketballDrive | 3.36% | 0.09% | 5.33% | 0.09% | 5.27% | 0.09% |
| | BQTerrace | 3.68% | 0.18% | 3.04% | 0.18% | 2.58% | 0.18% |
| Class C | BasketballDrill | −10.19% | 0.30% | −7.81% | 0.29% | −8.04% | 0.29% |
| | BQMall | −1.76% | 0.31% | −1.50% | 0.31% | −1.66% | 0.31% |
| | PartyScene | −6.65% | 0.19% | −4.43% | 0.17% | −4.39% | 0.17% |
| | RaceHorses | 0.04% | 0.14% | 0.54% | 0.14% | 0.39% | 0.14% |
| Class D | BasketballPass | −4.50% | 0.57% | −4.30% | 0.52% | −4.15% | 0.54% |
| | BQSquare | 1.28% | 0.99% | 2.64% | 0.97% | 2.33% | 0.97% |
| | BlowingBubbles | −3.32% | 0.65% | −3.15% | 0.63% | −3.17% | 0.63% |
| | RaceHorses | 2.40% | 0.47% | 2.02% | 0.48% | 1.96% | 0.48% |
| Class E | FourPeople | 3.10% | 0.60% | 4.32% | 0.59% | 3.33% | 0.60% |
| | Johnny | 5.13% | 1.30% | 5.32% | 1.29% | 3.47% | 1.30% |
| | KristenAndSara | 0.56% | 0.78% | 1.70% | 0.77% | 0.29% | 0.77% |
| | Overall | −1.16% | 0.35% | −0.36% | 0.35% | −0.83% | 0.35% |
| | $T_{Enc}$ | 112.54% | | 100.53% | | 102.78% | |

Further information related to the sequences listed in Table X can be found in Bossen et al., "JVET common test conditions and software reference configurations for SDR video" (2020).

It is found that the proposed method in this embodiment can provide 1.77% BD-Rate savings under Random Access configurations, when compared with the default rate control scheme in VTM-13.0. Meanwhile, it is found that the proposed method in this embodiment reduces 0.01% bit-rate error. This suggests that the pre-analysis process and neural network based model parameter derivation in this embodiment can effectively prevent bit-rate overflow or underflow within the slide window, benefiting the compression of videos with scene changes. In addition to proper frame-level quantization parameter derivation, more accurate coding tree unit level model parameters are predicted based on which a wiser coding tree unit level bit allocation is conducted for higher rate-distortion performance.

From the results in Table VIII, it can be found that the proposed method in this embodiment outperforms Ren et al.'s method with 0.25% BD-Rate savings under Random Access configurations.

From the results in Table IX, it can be seen that the proposed method in this embodiment obtains a 6.51% bit-rate increase when compared with the VTM-13.0 with fixed-quantization parameter settings under Random Access configurations. This may be because a larger GOP size in Random Access configurations may bring additional challenges to accurate bit allocation.

Regarding of the rate-distortion performance under Low Delay B configurations, from the results in Table X, it can be found that the proposed rate control algorithm in this embodiment obtains 1.16% BD-Rate savings compared with fixed-quantization parameter results. Due to simple reference relationship in Low Delay B configurations, it is feasible for bit allocation to achieve an optimal allocation ratio, further outperforming fixed-quantization parameter configurations.

According to the results in Table VIII, due to proper coding tree unit level bit allocation, the proposed rate control algorithm in this embodiment achieves 0.77% BD-Rate savings when compared with default rate control in VTM-13.0, and achieves 0.30% BD-Rate savings when compared with Ren et al.'s method. In analogous to Random Access configurations, the bit-rate error of the proposed method in this embodiment is similar to the default rate control scheme and Ren et al.'s method.

The last row in each of Table IX and Table X illustrates the $T_{Enc}$ for Random Access and Low Delay B configurations, respectively. It can be seen that for Random Access configurations, encoding time of the proposed algorithm in this embodiment increases around 22%, whereas for Low Delay B configurations, encoding time of the proposed algorithm in this embodiment increases by around 12%. In this embodiment, the extra computational complexity is mainly introduced by pre-analysis process and estimation of model parameters with neural networks. It is envisaged that in some examples the time cost of neural network-based prediction of the embodiment can be reduced by implementing it on a GPU-CPU platform. It is envisaged that in some examples in practice, the pre-analysis process of the embodiment can be combined with pre-analysis coding tools such as CU-Tree as disclosed in Garrett-Glaser, "A novel macroblock-tree algorithm for high-performance optimization of dependent video coding in h.264/AVC" (2009), Temporal Dependency Model (TPL Model) as disclosed in Han et al., "A temporal dependency model for rate-distortion optimization in video coding" (2019), etc. As such, the complexity may be reduced or even become negligible.

FIGS. 5A to 5D illustrate rate-distortion performance of the rate control algorithm of FIG. 1 in one implementation ("Proposed"), the default rate control algorithm in VTM-13.0 ("Default"), and the fixed-quantization parameter algorithm ("FixedQP"), all encoded with Random Access configuration in VTM-13.0. Specifically, FIG. 5A shows the rate-distortion performance of these methods on processing sequence "Cactus", FIG. 5B shows the rate-distortion performance of these methods on processing sequence "PartyScene", FIG. 5C shows the rate-distortion performance of these methods on processing sequence "BasketballDrill", FIG. 5D shows the rate-distortion performance of these methods on processing sequence "MarketPlace".

FIGS. 6A to 6D illustrate rate-distortion performance of the rate control algorithm of FIG. 1 in one implementation ("Proposed"), the default rate control algorithm in VTM-13.0 ("Default"), and the fixed-quantization parameter algorithm ("FixedQP"), all encoded with the Low Delay B configuration in VTM-13.0. Specifically, FIG. 6A shows the rate-distortion performance of these methods on processing sequence "BasketballDrill", FIG. 6B shows the rate-distortion performance of these methods on processing sequence "FourPeople", FIG. 6C shows the rate-distortion performance of these methods on processing sequence "BasketballDrive", FIG. 6D shows the rate-distortion performance of these methods on processing sequence "PartyScene".

From FIGS. 5A to 6D, it can be seen that generally, under both Random Access and Low Delay B configurations, the proposed rate control in this embodiment can provide better rate-distortion performance than the default rate control scheme.

Rate control analysis are also performed.

Figure 7A:
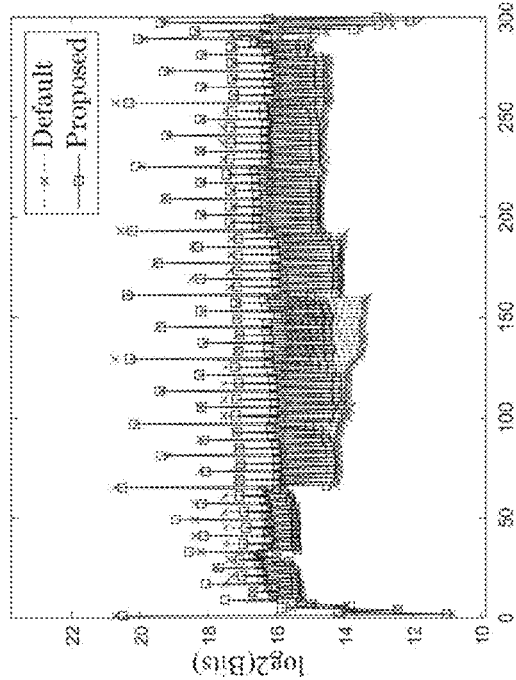
FIG. 7A is a graph showing bit-rate fluctuation of the rate control algorithm of FIG. 1 in one implementation ("Proposed") and the default rate control algorithm in VTM-13.0 ("Default") on processing sequence "MarketPlace", encoded with Random Access configuration (target bit-rate is set as 2172 kbps)
Figure 7B:
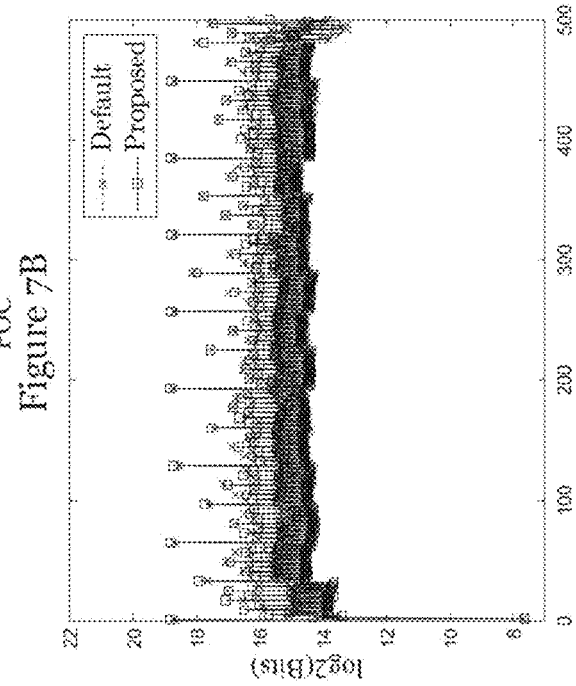
FIG. 7B is a graph showing bit-rate fluctuation of the rate control algorithm of FIG. 1 in one implementation ("Proposed") and the default rate control algorithm in VTM-13.0 ("Default") on processing sequence "CatRobot", encoded with Random Access configuration (target bit-rate is set as 7854 kbps)
Figure 7C:
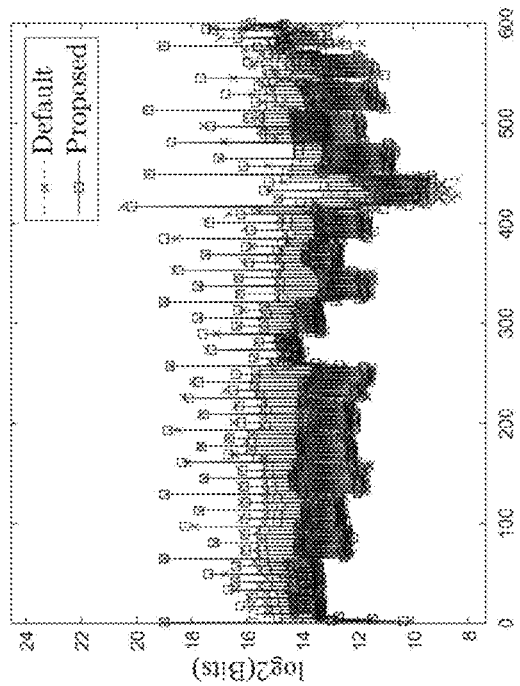
FIG. 7C is a graph showing bit-rate fluctuation of the rate control algorithm of FIG. 1 in one implementation ("Proposed") and the default rate control algorithm in VTM-13.0 ("Default") on processing sequence "FoodMarket", encoded with Random Access configuration (target bit-rate is set as 2045 kbps)
Figure 7D:
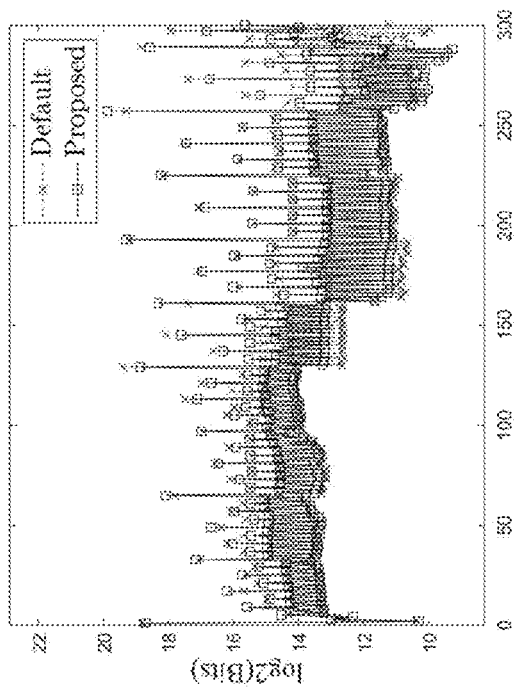
FIG. 7D is a graph showing bit-rate fluctuation of the rate control algorithm of FIG. 1 in one implementation ("Proposed") and the default rate control algorithm in VTM-13.0 ("Default") on processing sequence "BasketballDrill", encoded with Random Access configuration (target bit-rate is set as 2531 kbps)

FIGS. 7A to 7D show bit-rate fluctuation of the rate control algorithm of FIG. 1 in one implementation ("Proposed") and the default rate control algorithm in VTM-13.0 ("Default") on processing various sequences. Specifically, FIG. 7A shows the bit-rate fluctuation of these rate control algorithms on processing sequence "MarketPlace" (target bit-rate is set as 2172 kbps), FIG. 7B shows the bit-rate fluctuation of these rate control algorithms on processing sequence "CatRobot" (target bit-rate is set as 7854 kbps), FIG. 7C shows the bit-rate fluctuation of these rate control algorithms on processing sequence "FoodMarket" (target bit-rate is set as 2045 kbps), and FIG. 7D shows the bit-rate fluctuation of these rate control algorithms on processing sequence "BasketballDrill" (target bit-rate is set as 2531 kbps). It can be seen that the proposed algorithm in this embodiment can provide more stable output bit-rate compared with the default rate control algorithm in VTM-13.0. In the example experiment for obtaining the results in FIGS. 7A to 7D, high temporal layer frames are allocated more bits to ensure the overall performance.

A virtual buffer is built for evaluating buffer fullness of proposed algorithm, which is calculated as follows:

$$B_N = \frac{\sum_{i=0}^{N-1} R_i - BR \cdot N}{BS} \quad (44)$$

where $B_N$ is the buffer fullness at the frame N, and $R_i$ is actual cost of frame i. BR and BS represent buffer rate and buffer size respectively, which can be derived as:

$$BR = \frac{R^{(T)}}{FR} \quad (45)$$

$$BS = R^{(T)} \quad (46)$$

Herein, $R^{(T)}$ is the target bit-rate of encoding sequence and FR is corresponding frame rate.

Figure 8A:
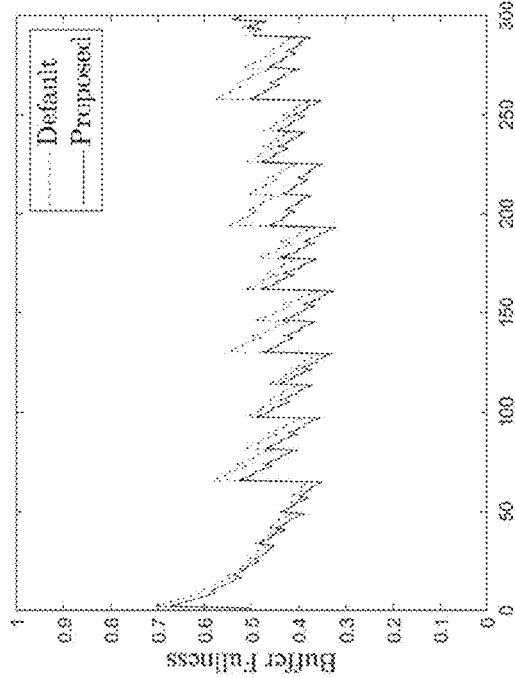
FIG. 8A is a graph showing buffer status of the rate control algorithm of FIG. 1 in one implementation ("Proposed") and the default rate control algorithm in VTM-13.0 ("Default") on processing sequence "MarketPlace", encoded with Random Access configuration (target bit-rate is set as 2172 kbps)
Figure 8B:
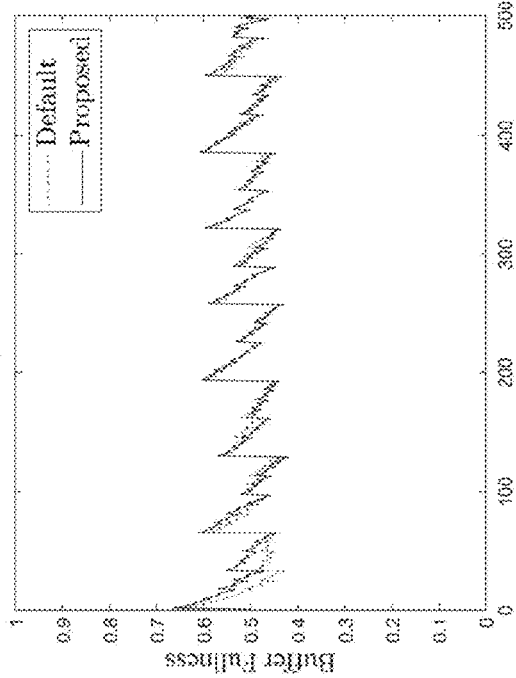
FIG. 8B is a graph showing buffer status of the rate control algorithm of FIG. 1 in one implementation ("Proposed") and the default rate control algorithm in VTM-13.0 ("Default") on processing sequence "CatRobot", encoded with Random Access configuration (target bit-rate is set as 7854 kbps)
Figure 8C:
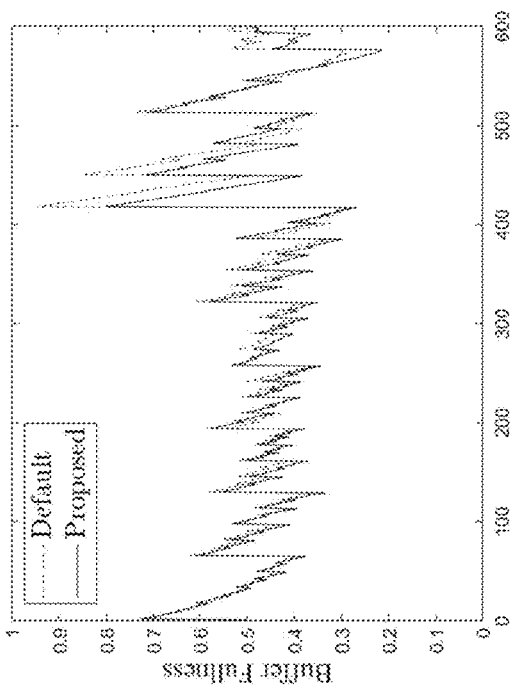
FIG. 8C is a graph showing buffer status of the rate control algorithm of FIG. 1 in one implementation ("Proposed") and the default rate control algorithm in VTM-13.0 ("Default") on processing sequence "FoodMarket", encoded with Random Access configuration (target bit-rate is set as 2045 kbps)
Figure 8D:
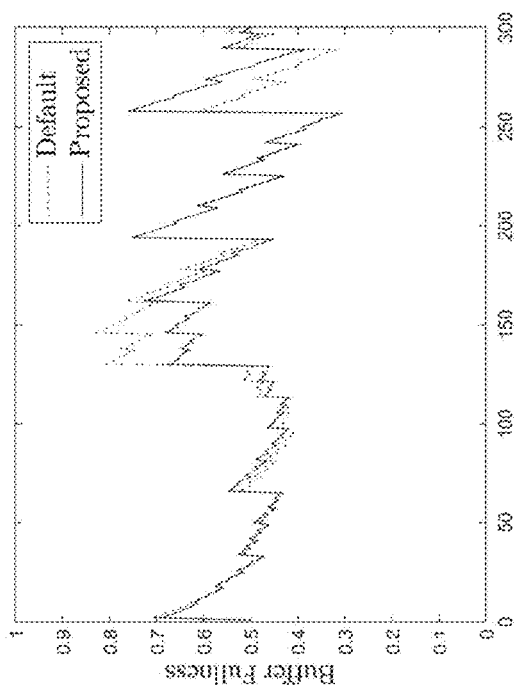
FIG. 8D is a graph showing buffer status of the rate control algorithm of FIG. 1 in one implementation ("Proposed") and the default rate control algorithm in VTM-13.0 ("Default") on processing sequence "BasketballDrill", encoded with Random Access configuration (target bit-rate is set as 2531 kbps)

FIGS. 8A to 8D show buffer status of the rate control algorithm of FIG. 1 in one implementation ("Proposed") and the default rate control algorithm in VTM-13.0 ("Default") on processing various sequences. Specifically, FIG. 8A shows the buffer status of these rate control algorithms on processing sequence "MarketPlace" (target bit-rate is set as 2172 kbps), FIG. 8B shows the bit buffer status of these rate control algorithms on processing sequence "CatRobot" (target bit-rate is set as 7854 kbps), FIG. 8C shows the buffer status of these rate control algorithms on processing sequence "FoodMarket" (target bit-rate is set as 2045 kbps), and FIG. 8D shows the buffer status of these rate control algorithms on processing sequence "BasketballDrill" (target bit-rate is set as 2531 kbps).

It is found that the proposed algorithm in this embodiment has a more stable buffer status compared with the default rate control algorithm. The proposed algorithm in this embodiment can accurately estimate rate-distortion performance of the frame to be encoded, which enables control of the virtual buffer status with higher accuracy. For example, when a scene change occurs in "MarketPlace" between POC 400 and POC 500, the proposed algorithm in this embodiment can reduce bit-rate POC 416 (temporal layer o) cost to avoid quality loss of following frames. As a result, an overall rate-distortion performance gain is obtained. It is also found that the proposed algorithm in this embodiment has lower buffer fullness, which may be useful for streaming applications.

Figure 9A:
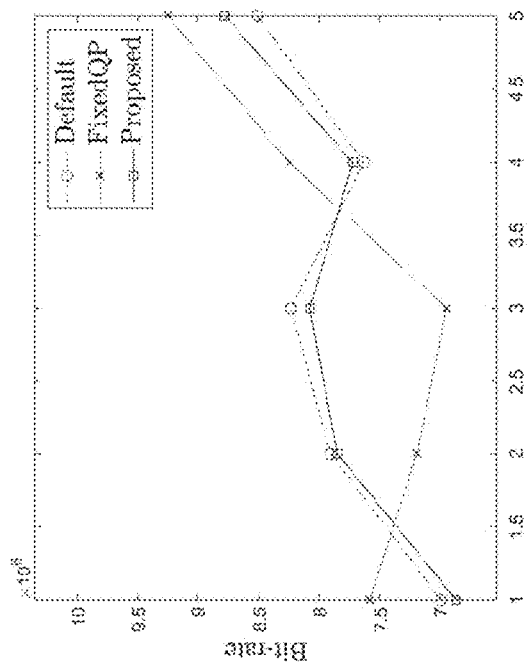
FIG. 9A is a graph showing bit-rate fluctuation of the rate control algorithm of FIG. 1 in one implementation ("Proposed"), the default rate control algorithm in VTM-13.0 ("Default"), and the fixed-quantization parameter configuration in VTM-13.0 ("FixedQP") on processing sequence "MarketPlace", encoded with Random Access configuration (target bit-rate is set as 2172 kbps)
Figure 9B:
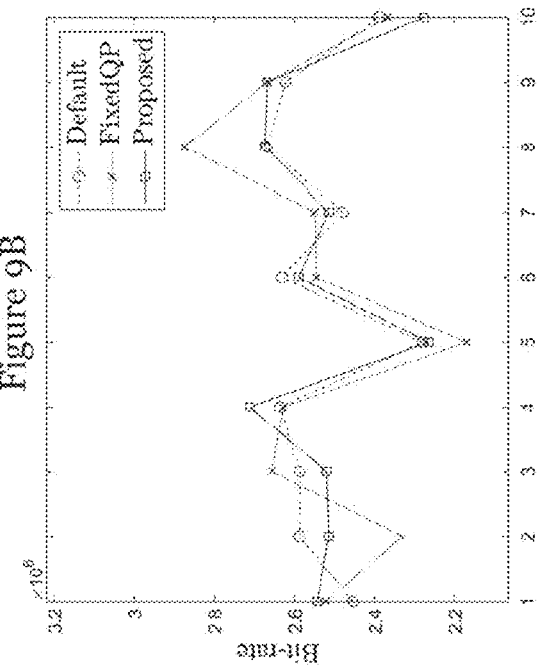
FIG. 9B is a graph showing bit-rate fluctuation of the rate control algorithm of FIG. 1 in one implementation ("Proposed"), the default rate control algorithm in VTM-13.0 ("Default"), and the fixed-quantization parameter configuration in VTM-13.0 ("FixedQP") on processing sequence "CatRobot", encoded with Random Access configuration (target bit-rate is set as 7854 kbps)
Figure 9C:
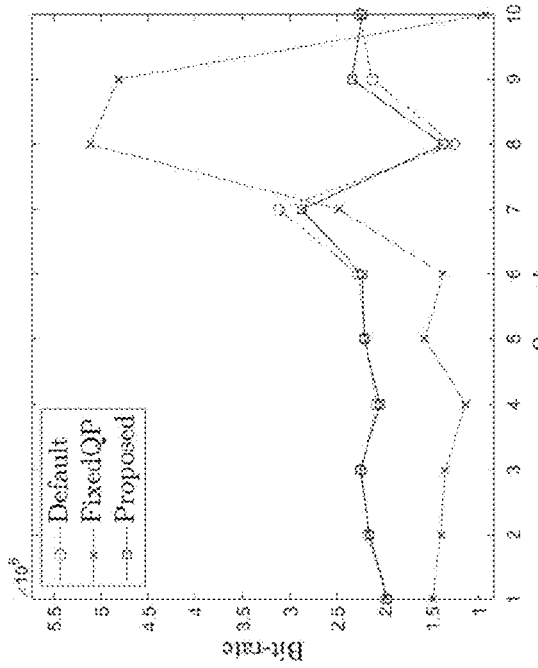
FIG. 9C is a graph showing bit-rate fluctuation of the rate control algorithm of FIG. 1 in one implementation ("Proposed"), the default rate control algorithm in VTM-13.0 ("Default"), and the fixed-quantization parameter configuration in VTM-13.0 ("FixedQP") on processing sequence "FoodMarket", encoded with Random Access configuration (target bit-rate is set as 2045 kbps)
Figure 9D:
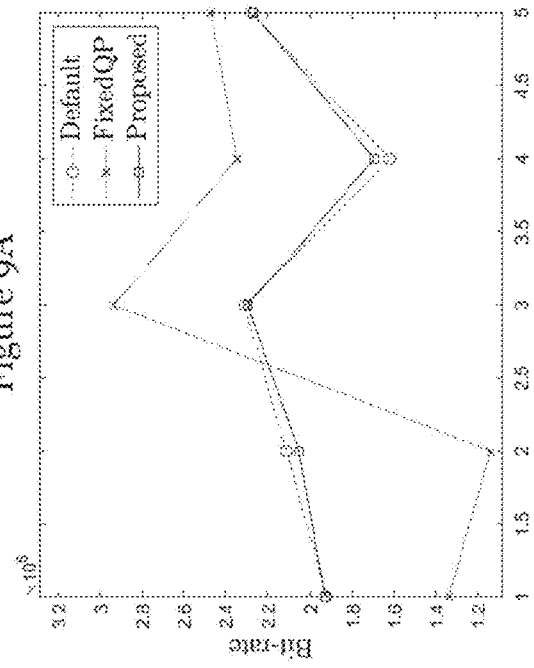
FIG. 9D is a graph showing bit-rate fluctuation of the rate control algorithm of FIG. 1 in one implementation ("Proposed"), the default rate control algorithm in VTM-13.0 ("Default"), and the fixed-quantization parameter configuration in VTM-13.0 ("FixedQP") on processing sequence "BasketballDrill", encoded with Random Access configuration (target bit-rate is set as 2531 kbps)

FIGS. 9A to 9D show bit-rate fluctuation of the rate control algorithm of FIG. 1 in one implementation ("Proposed"), the default rate control algorithm in VTM-13.0 ("Default"), and the fixed-quantization parameter configuration in VTM-13.0 ("FixedQP") on processing various sequences encoded with Random Access configuration. Specifically, FIG. 9A shows the bit-rate fluctuation of these methods on processing sequence "MarketPlace" (target bit-rate is set as 2172 kbps), FIG. 8B shows the bit-rate fluctuation of these methods on processing sequence "CatRobot" (target bit-rate is set as 7854 kbps), FIG. 8C shows the bit-rate fluctuation of these methods on processing sequence "FoodMarket" (target bit-rate is set as 2045 kbps), and FIG. 8D shows the bit-rate fluctuation of these methods on processing sequence "BasketballDrill" (target bit-rate is set as 2531 kbps). From FIGS. 9A to 9D, it can be seen that the rate control method in this embodiment achieve more stable output bit-rates.

Example System

Figure 10:
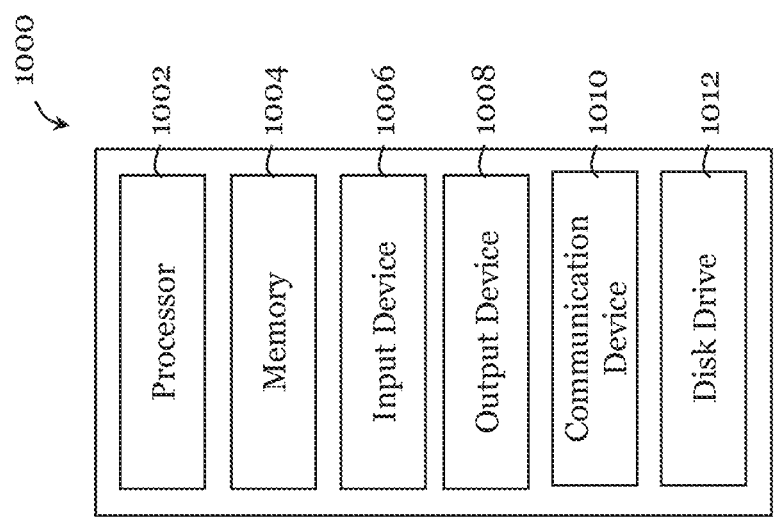
FIG. 10 is a block diagram of an example data processing system operable to implement one or more method embodiments of the invention.

FIG. 10 shows an example data processing system 1000 in some embodiments of the invention, which can be used for performing or facilitating performing of one or more method embodiments of the invention. For example, the system 1000 can be used to perform at least part of the operation 100 in FIG. 1. For example, the system 1000 can be used to implement at least part of the neural network structure 300. For example, the system 1000 can be used to implement at least part of the operation 400. For example, the system 1000 can be used to perform at least part of the method 1100 in FIG. 11. For example, the system 1000 can be used to perform at least part of the method 1200 in FIG. 12.

The data processing system 1000 generally comprises suitable components necessary to receive, store, and execute appropriate computer instructions, commands, and/or codes. The main components of the data processing system 1000 are a processor 1002 and a memory (storage) 1004. The processor 1002 may include one or more of: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), or any other digital or analog circuitry/circuitries configured to interpret and/or to execute program instructions and/or to process signals and/or information and/or data. The memory 1004 may include: one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 1004. Computer instructions for executing or facilitating executing of the method embodiments of the invention may be stored in the memory 1004. Data (e.g., training data, testing data, and/or validation data), algorithms, models, etc., associated with machine learning based operations can be stored in the memory 1004. Data, algorithms, models, etc., associated with non machine-learning based operations can be stored in the memory 1004. Processing results can be stored in the memory 1004. The processor 1002 and memory (storage) 1004 may be integrated or separated (and operably connected). Optionally, the data processing system 1000 further includes one or more input devices 1006. Example of such input device 1006 include: keyboard, mouse, stylus, image scanner, microphone, tactile/touch input device (e.g., touch sensitive screen), image/video input device (e.g., camera), etc. Optionally, the data processing system 1000 further includes one or more output devices 1008. Example of such output device 1008 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The data processing system 1000 may further include one or more disk drives 1012 which may include one or more of: solid state drive, hard disk drive, optical drive, flash drive, magnetic tape drive, etc. A suitable operating system may be installed in the data processing system 1000, e.g., on the disk drive 1012 or in the memory 1004. The memory 1004 and the disk drive 1012 may be operated by the processor 1002. Optionally, the data processing system 1000 also includes a communication device 1010 for establishing one or more communication links (not shown) with one or more other computing devices, such as servers, personal computers, terminals, tablets, phones, watches, IoT devices, or other wireless computing devices. The communication device 1010 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1002, the memory 1004 (optionally the input device(s) 1006, the output device(s) 1008, the communication device(s) 1010 and the disk drive(s) 1012, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud computing network. A person skilled in the art would appreciate that the data processing system 1000 shown in FIG. 10 is merely an example and that the data processing system 1000 can have different configurations (e.g., include additional components, has fewer components, etc.) in other embodiments.

Although not required, one or more embodiments described with reference to the Figures can be implemented as an application programming interface (API) or as a series of libraries for use by a developer or can be included within another software application, such as a terminal or computer operating system or a portable computing device operating system. In one or more embodiments, as program modules include routines, programs, objects, components, and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

Misc.

The above disclosure provides some embodiments of the invention related to a neural network based rate control algorithm for VTM-13.0. In some embodiments, by utilizing pre-analysis information, accurate model parameters can be predicted by neural network, and the model parameters can in turn be used for coding tree unit level bit allocation and coding parameters derivation. In some embodiments, based on the acquisition of content rate-distortion characteristics, the rate control algorithm can obtain improved rate-distortion performance compared with the default rate control algorithm in VTM-13.0. In one example, compared with default rate control algorithm in VTM-13.0, the rate control algorithm obtains 1.77% BD-Rate savings under Random Access configurations and 0.77% BD-Rate savings under Low Delay B configurations. In some embodiments, the rate control algorithm can adapt to scene changing scenarios, with more stable buffer status.

In some embodiments, there is provided a neural network based rate control algorithm for Versatile Video Coding (VVC). In some embodiments, the method relies on the modeling of Rate-Quantization (R-Q) and distortion-quantization (D-Q) relationships in a data driven manner based on characteristics of prediction residuals. In particular, in some embodiments, a pre-analysis framework is adopted to obtain prediction residuals, which govern the rate-distortion (R-D) behaviors. By inferring from the prediction residuals using deep neural networks, coding tree unit (CTU) level rate-quantization and distortion-quantization model parameters can be derived, to efficiently guide optimal bit allocation. In some embodiments, the coding parameters, including quantization parameter (QP) and $\lambda$, at both frame and coding tree unit levels, are obtained according to allocated bit-rates. In one implementation, the rate control algorithm is implemented on VVC Test Model (VTM-13.0).

Some embodiments of the invention provide a low complexity CTU level pre-analysis, which can be applied to different types of frames. Some embodiments of the invention provide R-Q and D-Q models are built for neural network training and operation, e.g., for VVC. Some embodiments of the invention provide a residual domain neural network based R-D estimation scheme, e.g., for VTM-13.0. Some embodiments of the invention provide an optimal bit allocation scheme for the rate control algorithm. The proposed pre-analysis in some embodiments of the invention extends analysis from pixel domain to residual domain, for ensuring high prediction accuracy. The utilized R-Q and D-Q models in some embodiments can accurately model R-D characteristics and can facilitate training. The utilized neural network in some embodiments can accurately estimate R-D characteristics to facilitate rate control. In some embodiments, the optimal bit allocation is achieved by utilizing estimated model parameters.

Some embodiments of the invention aims to provide improved video quality under the constraint of bit-rate budget. Some embodiments of the invention can provide improved R-D performance and/or more stable bit-rate fluctuation. Compared with the existing algorithms, some embodiments of the invention can achieve better coding performance and/or more stable buffer status.

In some implementations, the time cost of neural network based prediction can be reduced by implementing it on a GPU-and-CPU platform. In some implementations, the proposed pre-analysis process can be combined with pre-analysis coding such as CU-Tree or Temporal Dependency Model (TPL Model) to reduce complexity.

The invention can be used for video codec to improve coding performance. The invention can be used in video transmission and/or storage, especially when under resource constraints.

It should be noted that some embodiments of the invention may include additional or alternative advantages not specifically described herein.

It will be appreciated by a person skilled in the art that variations and/or modifications may be made to the described and/or illustrated embodiments of the invention to provide other embodiments of the invention. The described and/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings).

The invention claimed is:

1. A computer-implemented method for facilitating encoding of video data, comprising:
performing an operation to determine prediction residuals associated with a unit of the video data; and
processing, using a neural network arrangement, the prediction residuals associated with the unit of the video data to determine model parameters associated with a rate-distortion model for the unit of the video data;
wherein the model parameters are arranged to facilitate encoding of at least the unit of the video data; the model parameters comprising a bit-rate related model parameter α and a distortion related model parameter β;
wherein the neural network arrangement comprises:
a first neural network arrangement arranged to process the prediction residuals associated with the unit of the video data to determine the model parameters for intra-frame coding; and/or
a second neural network arrangement arranged to process the prediction residuals associated with the unit of the video data to determine the model parameters for inter-frame coding, wherein the second neural network arrangement comprises:
a first neural network arranged to process the prediction residuals associated with the unit of the video data to determine the bit-rate related model parameter α for inter-frame coding; and
a second neural network arranged to process the prediction residuals associated with the unit of the video data to determine the distortion related model parameter β for inter-frame coding.

2. The computer-implemented method of claim 1, wherein the unit of the video data corresponds to a coding tree unit of the video data.

3. The computer-implemented method of claim 2, wherein the operation comprises partitioning the unit of the video data using at least one of the following partition schemes: quad-tree (QT), binary-tree (BT), or ternary-tree (TT).

4. The computer-implemented method of claim 3, wherein the operation comprises partitioning the unit of the video data using a quad-tree (QT) partition scheme.

5. The computer-implemented method of claim 2,
wherein the operation comprises processing, using an encoder, part of the video data containing the unit of the video data;
wherein the part of the video data correspond to video data of a frame of a video.

6. The computer-implemented method of claim 5, wherein the encoder is a Versatile Video Coding (VVC) based encoder.

7. The computer-implemented method of claim 1, wherein the first neural network arrangement comprises:
a first neural network arranged to process the prediction residuals associated with the unit of the video data to determine the bit-rate related model parameter α for intra-frame coding; and
a second neural network arranged to process the prediction residuals associated with the unit of the video data to determine the distortion related model parameter β for intra-frame coding.

8. The computer-implemented method of claim 7,
wherein the first neural network of the first neural network arrangement comprises a feature extractor and a regressor; and/or
wherein the second neural network of the first neural network arrangement comprises a feature extractor and a regressor.

9. The computer-implemented method of claim 7, wherein the first neural network and the second neural network of the first neural network arrangement have substantially the same neural network structure.

10. The computer-implemented method of claim 1,
wherein the first neural network of the second neural network arrangement comprises a feature extractor and a regressor; and/or
wherein the second neural network of the second neural network arrangement comprises a feature extractor and a regressor.

11. The computer-implemented method of claim 1, wherein the first neural network and the second neural network of the second neural network arrangement have substantially the same neural network structure.

12. A computer-implemented method for facilitating encoding of video data, comprising:

performing an operation to determine prediction residuals associated with a unit of the video data; and processing, using a neural network arrangement, the prediction residuals associated with the unit of the video data to determine model parameters associated with a rate-distortion model for the unit of the video data;

wherein the model parameters are arranged to facilitate encoding of at least the unit of the video data; the model parameters comprising a bit-rate related model parameter $\alpha$ and a distortion related model parameter $\beta$;

wherein the rate-distortion model is representable as:

$$D = \frac{\alpha\beta}{R} + C_{DQ}$$

where R denotes bit-rate, D denotes distortion, and $C_{DQ}$ is a constant.

13. A computer-implemented method for facilitating encoding of video data, comprising:

performing an operation to determine prediction residuals associated with a unit of the video data; and processing, using a neural network arrangement, the prediction residuals associated with the unit of the video data to determine model parameters associated with a rate-distortion model for the unit of the video data; and adjusting the determined model parameters using one or more adjustment factors to obtain adjusted model parameters to facilitate encoding of at least the unit of the video data;

wherein the model parameters are arranged to facilitate encoding of at least the unit of the video data; the model parameters comprising a bit-rate related model parameter $\alpha$ and a distortion related model parameter $\beta$;

wherein the neural network arrangement comprises:

a first neural network arrangement arranged to process the prediction residuals associated with the unit of the video data to determine the model parameters for intra-frame coding;

and/or a second neural network arrangement arranged to process the prediction residuals associated with the unit of the video data to determine the model parameters for inter-frame coding; and wherein the adjusting of the determined model parameters comprises:

adjusting the bit-rate related model parameter $\alpha$ using a first adjustment factor to obtain adjusted bit-rate related model parameter $\beta$; and/or adjusting the distortion related model parameter $\beta$ using a second adjustment factor to obtain adjusted distortion related model parameter $\beta$.

14. The computer-implemented method of claim 13, wherein the adjusting of the bit-rate related model parameter $\alpha$ comprises:

adjusting the bit-rate related model parameter $\alpha$ for intra-frame coding using the first adjustment factor to obtain adjusted bit-rate related model parameter $\alpha_i$ for inter-frame coding; or adjusting the bit-rate related model parameter $\alpha$ for intra-frame coding using the first adjustment factor to obtain adjusted bit-rate related model parameter $\alpha_i$ for intra-frame coding.

15. The computer-implemented method of claim 13, wherein the adjusting of the distortion related model parameter $\beta$ comprises:

adjusting the distortion related model parameter $\beta$ for intra-frame coding using the second adjustment factor to obtain adjusted distortion related model parameter $\beta_i$ for inter-frame coding; or adjusting the distortion related model parameter $\beta$ for intra-frame coding using the second adjustment factor to obtain adjusted distortion related model parameter $\beta_i$ for intra-frame coding.

16. The computer-implemented method of claim 13, further comprising:

determining a target bit-rate for the unit of the video data based on the adjusted model parameters;

determining a quantization step size for the unit of the video data based on the target bit-rate;

determining coding parameters for encoding the unit of the video data based on the quantization step size; and encoding the unit of the video data based on the coding parameters.

17. The computer-implemented method of claim 16, wherein the determining of the quantization step size for the unit of the video data is based on:

$$Q_i = \frac{\alpha_i}{R_i}$$

where $Q_i$ is the quantization step size for the unit of the video data and $R_i$ is the target bit-rate for the unit of the video data.

18. The computer-implemented method of claim 17, wherein the coding parameters for encoding the unit of the video data comprises a quantization parameter $QD_i$ and a Lagrangian parameter $\lambda_i$.

19. The computer-implemented method of claim 18, wherein the determining of the coding parameters for encoding the unit of the video data is based on:

$$QP_i = (\log_{X_1} Q_i) \times X_2 + X_3 \text{ and } \lambda_i = Y_1 \times Y_2^{\frac{QP_i}{Y_3}}$$

where $X_1$, $X_2$, $X_3$, $Y_1$, $Y_2$, $Y_3$ are real numbers.

20. The computer-implemented method of claim 16, wherein the encoding of the unit of the video data is performed using Versatile Video Coding (VVC) based encoding technique.

21. The computer-implemented method of claim 16, further comprising, after encoding of the unit of the video data:

updating the first adjustment factor to obtain an updated first adjustment factor for use in subsequent bit-rate related model parameter adjustment; and/or updating the second adjustment factor to obtain an updated second adjustment factor for use in subsequent distortion related model parameter adjustment.

22. The computer-implemented method of claim 21, wherein the updating of the first adjustment factor is based on: an actual output bit-rate and an actual quantization step size associated with the encoding of the unit of the video data, and the bit-rate related model parameter $\alpha$ for the unit of the video data.

23. The computer-implemented method of claim 21, wherein the updating of the second adjustment factor is based on: an output bit-rate and a Lagrangian parameter associated with the encoding of the unit of the video data, the updated first adjustment factor, and the bit-rate related model parameter α and the distortion related model parameter β for the unit of the video data.

24. A system for facilitating encoding of video data, comprising:
   one or more processors; and
   memory storing one or more programs configured to be executed by the one or more processors, the one or more programs including instructions for performing the computer-implemented method of claim 1.

25. A non-transitory computer-readable storage medium storing one or more programs configured to be executed by one or more processors, the one or more programs including instructions for performing the computer-implemented method of claim 1.

\* \* \* \* \*